United States Patent
Han

(10) Patent No.: US 12,356,106 B2
(45) Date of Patent: Jul. 8, 2025

(54) DIGITAL PHOTOGRAPHING APPARATUS INCLUDING A PLURALITY OF OPTICAL SYSTEMS FOR ACQUIRING IMAGES UNDER DIFFERENT CONDITIONS AND METHOD OF OPERATING THE SAME

(71) Applicant: SAMSUNG ELECTRONICS CO., LTD., Suwon-si (KR)

(72) Inventor: Hee-Chul Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/961,771

(22) Filed: Oct. 7, 2022

(65) Prior Publication Data
US 2023/0037167 A1 Feb. 2, 2023

Related U.S. Application Data

(63) Continuation of application No. 17/347,660, filed on Jun. 15, 2021, now Pat. No. 11,496,696, which is a
(Continued)

(30) Foreign Application Priority Data

Nov. 24, 2015 (KR) .................. 10-2015-0164841

(51) Int. Cl.
*H04N 5/272* (2006.01)
*H04N 5/265* (2006.01)
(Continued)

(52) U.S. Cl.
CPC ............ *H04N 5/272* (2013.01); *H04N 5/265* (2013.01); *H04N 13/271* (2018.05);
(Continued)

(58) Field of Classification Search
CPC ...... H04N 5/272; H04N 5/265; H04N 13/271; H04N 23/45; H04N 23/52; H04N 23/555;
(Continued)

(56) References Cited

U.S. PATENT DOCUMENTS 7,839,446 B2 11/2010 Hirano
8,200,019 B2 6/2012 Zhang et al.
(Continued)

FOREIGN PATENT DOCUMENTS

| CN | 101064773 A | 10/2007 |
|---|---|---|
| CN | 101582993 A | 11/2009 |

(Continued)

OTHER PUBLICATIONS

Korean Office Action dated Nov. 29, 2022 for KR Application No. 10-2022-0117251.
(Continued)

*Primary Examiner* — Twyler L Haskins
*Assistant Examiner* — Akshay Trehan
(74) *Attorney, Agent, or Firm* — Nixon & Vanderhye P.C.

(57) ABSTRACT

A digital photographing apparatus is provided. The digital photographing apparatus includes a first optical system configured to acquire a wide-angle image including a subject, a second optical system configured to acquire a telephoto image with the subject zoomed, and a processor configured to determine whether to generate a synthesized image of the wide-angle image and the telephoto image based on one or more of an illuminance of the subject and a distance between the digital photographing apparatus and the subject.

21 Claims, 23 Drawing Sheets

Related U.S. Application Data continuation of application No. 15/070,109, filed on Mar. 15, 2016, now abandoned.

(51) Int. Cl.
| | |
|---|---|
| *H04N 13/271* | (2018.01) |
| *H04N 23/45* | (2023.01) |
| *H04N 23/50* | (2023.01) |
| *H04N 23/52* | (2023.01) |
| *H04N 23/63* | (2023.01) |
| *H04N 23/667* | (2023.01) |
| *H04N 23/69* | (2023.01) |
| *H04N 23/71* | (2023.01) |
| *H04N 23/80* | (2023.01) |
| *H04N 23/90* | (2023.01) |
| *H04N 23/951* | (2023.01) |

(52) U.S. Cl.
CPC ............ *H04N 23/45* (2023.01); *H04N 23/52* (2023.01); *H04N 23/555* (2023.01); *H04N 23/63* (2023.01); *H04N 23/667* (2023.01); *H04N 23/69* (2023.01); *H04N 23/71* (2023.01); *H04N 23/80* (2023.01); *H04N 23/90* (2023.01); *H04N 23/951* (2023.01)

(58) Field of Classification Search
CPC ...... H04N 23/63; H04N 23/667; H04N 23/69; H04N 23/71; H04N 23/80; H04N 23/951
See application file for complete search history.

(56) References Cited

U.S. PATENT DOCUMENTS

| | | | |
|---|---|---|---|
| 8,619,082 B1 | 12/2013 | Ciurea | |
| 8,878,907 B2 | 11/2014 | Awazu et al. | |
| 8,983,140 B2 | 3/2015 | Hohjoh | |
| 9,137,511 B1* | 9/2015 | LeGrand, III | G06T 7/586 |
| 9,253,397 B2 | 2/2016 | Lee et al. | |
| 9,338,365 B2 | 5/2016 | Ohwa et al. | |
| 9,392,295 B2 | 7/2016 | Bennett | |
| 10,291,842 B2 | 4/2019 | Kim et al. | |
| 2003/0020814 A1* | 1/2003 | Ono | H04N 23/00 348/E5.042 |
| 2008/0030592 A1* | 2/2008 | Border | H04N 23/45 348/E5.042 |
| 2009/0284618 A1 | 11/2009 | Kurahashi et al. | |
| 2009/0322891 A1* | 12/2009 | Kondo | H04N 23/90 348/E5.024 |
| 2010/0238327 A1* | 9/2010 | Griffith | H04N 23/69 348/240.99 |
| 2010/0245535 A1 | 9/2010 | Mauchly | |
| 2011/0080487 A1 | 4/2011 | Verikataraman | |
| 2011/0122252 A1* | 5/2011 | Choi | G03B 11/00 348/E5.09 |
| 2012/0002082 A1 | 1/2012 | Johnson | |
| 2012/0200667 A1 | 8/2012 | Gay | |
| 2012/0262607 A1* | 10/2012 | Shimura | H04N 23/951 348/E5.051 |
| 2012/0268641 A1* | 10/2012 | Kazama | H04N 23/45 348/E5.051 |
| 2013/0021447 A1* | 1/2013 | Brisedoux | H04N 23/741 348/241 |
| 2013/0050426 A1* | 2/2013 | Sarmast | H04N 13/25 348/E13.064 |
| 2013/0058591 A1* | 3/2013 | Nishiyama | H04N 23/80 348/262 |
| 2013/0077880 A1 | 3/2013 | Venkataraman | |
| 2013/0114862 A1* | 5/2013 | Hohjoh | H04N 23/6845 382/165 |
| 2013/0141539 A1 | 6/2013 | Awazu et al. | |
| 2013/0162782 A1* | 6/2013 | Kuo | G06T 7/593 348/47 |
| 2013/0215235 A1* | 8/2013 | Russell | G01B 11/25 348/47 |
| 2014/0092275 A1 | 4/2014 | Morihisa | |
| 2014/0092281 A1 | 4/2014 | Nisenzon | |
| 2014/0132735 A1* | 5/2014 | Lee | H04N 23/698 348/47 |
| 2014/0176767 A1* | 6/2014 | Hamel | H04N 1/19594 348/240.2 |
| 2014/0184852 A1* | 7/2014 | Niemi | H04N 23/741 348/239 |
| 2014/0347444 A1 | 11/2014 | Naske | |
| 2015/0022694 A1 | 1/2015 | Jogetsu et al. | |
| 2015/0042831 A1* | 2/2015 | Linaker | H04N 23/13 348/218.1 |
| 2015/0085174 A1 | 3/2015 | Shabtay | |
| 2015/0103200 A1 | 4/2015 | Vondran | |
| 2015/0116529 A1* | 4/2015 | Wu | H04N 23/45 348/222.1 |
| 2015/0124151 A1 | 5/2015 | Rodda | |
| 2015/0145950 A1 | 5/2015 | Murphy | |
| 2015/0146030 A1 | 5/2015 | Venkataraman | |
| 2015/0163400 A1 | 6/2015 | Geiss | |
| 2015/0172539 A1 | 6/2015 | Neglur | |
| 2015/0222881 A1* | 8/2015 | Lee | H04N 23/20 348/47 |
| 2015/0296148 A1 | 10/2015 | Tsuihiji | |
| 2015/0312486 A1* | 10/2015 | Song | G03B 7/08 348/262 |
| 2016/0057363 A1* | 2/2016 | Posa | H04N 1/2125 348/239 |
| 2016/0286120 A1 | 9/2016 | Kuo | |
| 2016/0309084 A1 | 10/2016 | Verikataraman | |
| 2016/0316149 A1 | 10/2016 | Chou | |
| 2017/0026582 A1* | 1/2017 | Kim | G06F 3/0416 |

FOREIGN PATENT DOCUMENTS

| | | |
|---|---|---|
| CN | 102075683 A | 5/2011 |
| CN | 102892008 A | 1/2013 |
| CN | 103034020 A | 4/2013 |
| CN | 103098456 A | 5/2013 |
| CN | 103649807 A | 3/2014 |
| CN | 103813108 A | 5/2014 |
| CN | 104580878 A | 4/2015 |
| EP | 2 549 763 A2 | 1/2013 |
| EP | 2 549 763 A3 | 3/2014 |
| JP | 2009-232118 A | 10/2009 |
| KR | 10-2017-0000311 | 1/2017 |
| WO | WO 2008/016474 A2 | 2/2008 |
| WO | 2012/161344 A1 | 11/2012 |
| WO | WO 2016/208849 | 12/2016 |

OTHER PUBLICATIONS

Chinese Office Action dated Jan. 19, 2023 for CN Application No. 202111364762.6.
European Notice of Allowance dated Feb. 2, 2023 for EP Application No. 21203355.9.
U.S. Appl. No. 17/347,660, filed Jun. 15, 2021; Han.
U.S. Appl. No. 15/070,109, filed Mar. 16, 2016; Han.
Search Report and Written Opinion mailed Jul. 26, 2016 in counterpart International Patent Application No. PCT/KR2016/003036.
Extended Search Report mailed Jul. 13, 2018 in counterpart European Patent Application No. 16868739.0.
European Office Action issued Mar. 27, 2019 for EP Application No. 16868739.0.
CN Office Action dated Feb. 6, 2020 for CN Application No. 2016800595368.
Chinese Office Action dated Sep. 14, 2020 for CN Application No. 201680059536.8.
European Office Action Report dated Mar. 7, 2022 for EP Application No. 21203355.9.
European Search Report dated Feb. 16, 2022 for EP Application No. 21203355.9.
European Office Action dated Aug. 17, 2022 for EP Application No. 21203355.9.

(56) References Cited

OTHER PUBLICATIONS

Korean Notice of Allowance dated Jun. 18, 2022 for KR Application No. 10-2015-0164841.
Chinese Office Action dated Feb. 23, 2023 for CN Application No. 202111255285.X.
IN Hearing Notice dated Mar. 6, 2025 for IN Application No. 201827007406.

* cited by examiner

DIGITAL PHOTOGRAPHING APPARATUS INCLUDING A PLURALITY OF OPTICAL SYSTEMS FOR ACQUIRING IMAGES UNDER DIFFERENT CONDITIONS AND METHOD OF OPERATING THE SAME

CROSS-REFERENCE TO RELATED APPLICATION

This application is a Continuation of U.S. application Ser. No. 17/347,660, filed Jun. 15, 2021, which is a Continuation of U.S. application Ser. No. 15/070,109, filed Mar. 15, 2016 (now abandoned), which claims priority to KR 10-2015-0164841, filed Nov. 24, 2015, the entire contents of each of which are all hereby incorporated herein by reference in their entireties.

BACKGROUND

1. Field

The present disclosure relates to digital photographing apparatuses and methods of operating the same, and for example, to digital photographing apparatuses including a plurality of optical systems for acquiring images under different optical conditions and methods of operating the same.

2. Description of Related Art

A digital photographing apparatus such as a smartphone, a tablet personal computer (PC), or a digital camera may include a plurality of optical systems.

Recently, a digital photographing apparatus equipped with optical systems having different properties has been used to satisfy user's various needs. A digital photographing apparatus including an asymmetric optical system having properties contrasting with each other may be used to maximize the usability thereof.

Examples of the implementation of the asymmetric optical system may include: an optical system for acquiring a wide-angle image and an optical system for acquiring a telephoto image; an optical system for acquiring a color image and an optical system for acquiring a black-and-white image; and a dual optical system and a sensor (e.g., an infrared (IR) sensor or a time-of-flight (TOF) sensor) for acquiring distance information by using an active mode.

SUMMARY

Digital photographing apparatuses and methods for automatically sensing a photographing environment to select one of two images acquired from an asymmetric optical system or to synthesize images acquired by the symmetric optical system are provided.

Digital photographing apparatuses and methods for automatically sensing a photographing environment to determine whether to perform an image synthesis, thus making it possible to generate an output image optimized for the photographing environment and thus reduce the power consumption thereof and save the time taken for image processing are provided.

Additional aspects will be set forth in part in the description which follows and, in part, will be apparent from the description.

According to an aspect of an example embodiment, a digital photographing apparatus includes: a first optical system configured to acquire a first image; a second optical system configured to acquire a second image under a different optical condition from the first image; a sensor configured to acquire photographing environment information including one or more of an illuminance of a subject, a distance between the digital photographing apparatus and the subject, and a photographing mode thereof; and a processor configured to determine whether to generate a synthesized image of the first image and the second image based on the photographing environment information.

The first image may be a wide-angle image including the subject; and the second image may be a telephoto image with the subject zoomed.

The processor may be configured to determine not to generate the synthesized image when the illuminance of the subject is lower than or equal to a critical subject illuminance.

The digital photographing apparatus may further include a display configured to display one or more of the wide-angle image and the telephoto image.

The processor may be configured to determine to generate the synthesized image when the illuminance of the subject is higher than a critical subject illuminance and the distance is within a perspective mode range.

The processor may be configured to determine not to generate the synthesized image when the illuminance of the subject is higher than a critical subject illuminance and the distance is out of a perspective mode range.

The digital photographing apparatus may further include a display configured to display the telephoto image when the distance is greater than or equal to a minimum or predetermined photographing distance of the second optical system and the photographing mode is a macro mode.

The digital photographing apparatus may further include a display configured to display the wide-angle image when the photographing mode is a close-up photographing mode.

The processor may be configured to acquire a depth map based on the wide-angle image and the telephoto image and to detect the distance based on the depth map.

The first image may be a color image including the subject and the second image may be a black-and-white image including the subject; and the processor may be configured to determine whether to generate the synthesized image based on one or more of the illuminance of the subject and the photographing mode.

The processor may be configured to determine to generate the synthesized image when the illuminance of the subject is a low (e.g., below a predetermined threshold value) illuminance and red/green/blue (RGB) signal data included in the color image is greater than or equal to a predetermined value.

The processor may be configured to determine not to generate the synthesized image when the illuminance of the subject is a low (e.g., below or less than a predetermined threshold value) illuminance and RGB signal data included in the color image is less than than a predetermined value.

The digital photographing apparatus may further include a display configured to display the black-and-white image.

The processor may be configured to determine not to generate the synthesized image when the illuminance of the subject is higher than a critical subject illuminance.

The processor may be configured to determine not to generate the synthesized image when the photographing mode is a black-and-white photographing mode.

The processor may be configured to determine whether to generate the synthesized image based on a power mode of the digital photographing apparatus.

According to an aspect of another example embodiment, a digital photographing apparatus includes: an active sensor configured to transmit a signal to a subject and receive the signal reflected from the subject to acquire distance information about the subject, the signal including one or more of a light signal and an electromagnetic wave signal; a plurality of cameras configured to acquire a first image and a second image including the subject and having different viewpoints; and a processor configured to determine, based on one or more of an illuminance of the subject and a photographing mode, whether to generate a synthesized depth map by synthesizing a first depth map acquired based on the distance information and a second depth map acquired based on the first image and the second image.

When the illuminance of the subject is less than or equal to a first illuminance, the processor may be configured to determine not to generate the synthesized depth map and to determine to acquire the first depth map from the active sensor.

Men the illuminance of the subject is greater than a first illuminance, the processor may be configured to determine not to generate the synthesized depth map and to determine to acquire the second depth map based on the first image and the second image.

When the photographing mode is a perspective mode, the processor may be configured to determine not to generate the synthesized depth map and to determine to acquire the second depth map based on the first image and the second image.

The active sensor may include, for example, a radar sensor configured to transmit an electromagnetic wave to the subject and receive the electromagnetic wave reflected to acquire the distance information about the subject; and the processor may be configured to determine to acquire the first depth map using the radar sensor when the photographing mode is a perspective mode.

The processor may be configured to determine to generate the synthesized depth map when the photographing mode is an indoor close-up photographing mode.

The processor may be configured to determine whether to generate the synthesized depth map based on a power mode of the digital photographing apparatus.

According to an aspect of another example embodiment, a digital photographing method includes: acquiring a first image; acquiring a second image under a different optical condition from the first image; acquiring photographing environment information including one or more of an illuminance of a subject, a distance between the digital photographing apparatus and the subject, and a photographing mode; and determining whether to generate a synthesized image of the first image and the second image based on the photographing environment information.

The first image may be a wide-angle image including the subject; and the second image may be a telephoto image with the subject zoomed.

The determining may include determining not to generate the synthesized image when the illuminance of the subject is less than or equal to a critical subject illuminance, The digital photographing method may further include displaying at least one of the wide-angle image and the telephoto image.

The determining may include determining to generate the synthesized image when the illuminance of the subject is greater than a critical subject illuminance and the distance is within a perspective mode range.

The determining may include determining not to generate the synthesized image when the illuminance of the subject is greater than a critical subject illuminance and the distance is out of a perspective mode range.

The digital photographing method may further include displaying the telephoto image when the distance is greater than or equal to a minimum photographing distance of the second optical system and the photographing mode is a macro mode.

The digital photographing method may further include displaying the wide-angle image when the photographing mode is a close-up photographing mode, The digital photographing method may further include: acquiring a depth map based on the wide-angle image and the telephoto image; and detecting the distance based on the depth map.

The first image may be a color image including the subject and the second image may be a black-and-white image including the subject; and the determining may include determining whether to generate the synthesized image based on one or more of the illuminance of the subject and the photographing mode.

The determining may include determining to generate the synthesized image when the illuminance of the subject is a low (e.g., below or less than a predetermined illuminance value) illuminance and RGB signal data included in the color image is greater than or equal to a predetermined value.

The determining may include determining not to generate the synthesized image when the illuminance of the subject is a low (e.g., below or less than a predetermined threshold value) illuminance and RGB signal data included in the color image is less than a predetermined value.

The digital photographing method may further include displaying the black-and-white image.

The determining may include determining not to generate the synthesized image when the illuminance of the subject is greater than a critical subject illuminance.

The determining may include determining not to generate the synthesized image when the photographing mode is a black-and-white photographing mode.

The determining may include determining whether to generate the synthesized image based on a power mode of a digital photographing apparatus.

According to an aspect of another example embodiment, a digital photographing method includes: transmitting a signal (e.g., one or more of a light signal and an electromagnetic wave signal) to a subject and receiving a reflected signal of the transmitted signal to acquire distance information about the subject; acquiring a first image and a second image including the subject and having different viewpoints; and determining, based on at least one of an illuminance of the subject and a photographing mode thereof, whether to generate a synthesized depth map by synthesizing a first depth map acquired based on the distance information and a second depth map acquired based on the first image and the second image.

The determining may include determining not to generate the synthesized depth map and determining to acquire the first depth map, when the illuminance of the subject is less than or equal to a first illuminance.

The determining may include determining not to generate the synthesized depth map and determining to acquire the second depth map based on the first image and the second image, when the illuminance of the subject is greater than a first illuminance.

The determining may include determining not to generate the synthesized depth map and determining to acquire the second depth map based on the first image and the second image, when the photographing mode is a perspective mode.

The acquiring of the distance information may include transmitting an electromagnetic wave to the subject and receiving a reflected electromagnetic wave of the transmitted electromagnetic wave to acquire the distance information about the subject; and the determining may include determining to acquire the first depth map using the distance information when the photographing mode is a perspective mode.

The determining may include determining to generate the synthesized depth map when the photographing mode is an indoor close-up photographing mode.

The determining may include determining whether to generate the synthesized depth map based on a power mode of a digital photographing apparatus.

According to an aspect of another example embodiment, a non-transitory computer-readable recording medium stores a program that when executed by a processor or computer causes a digital photographing apparatus to perform operations of any one of the above digital photographing methods.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
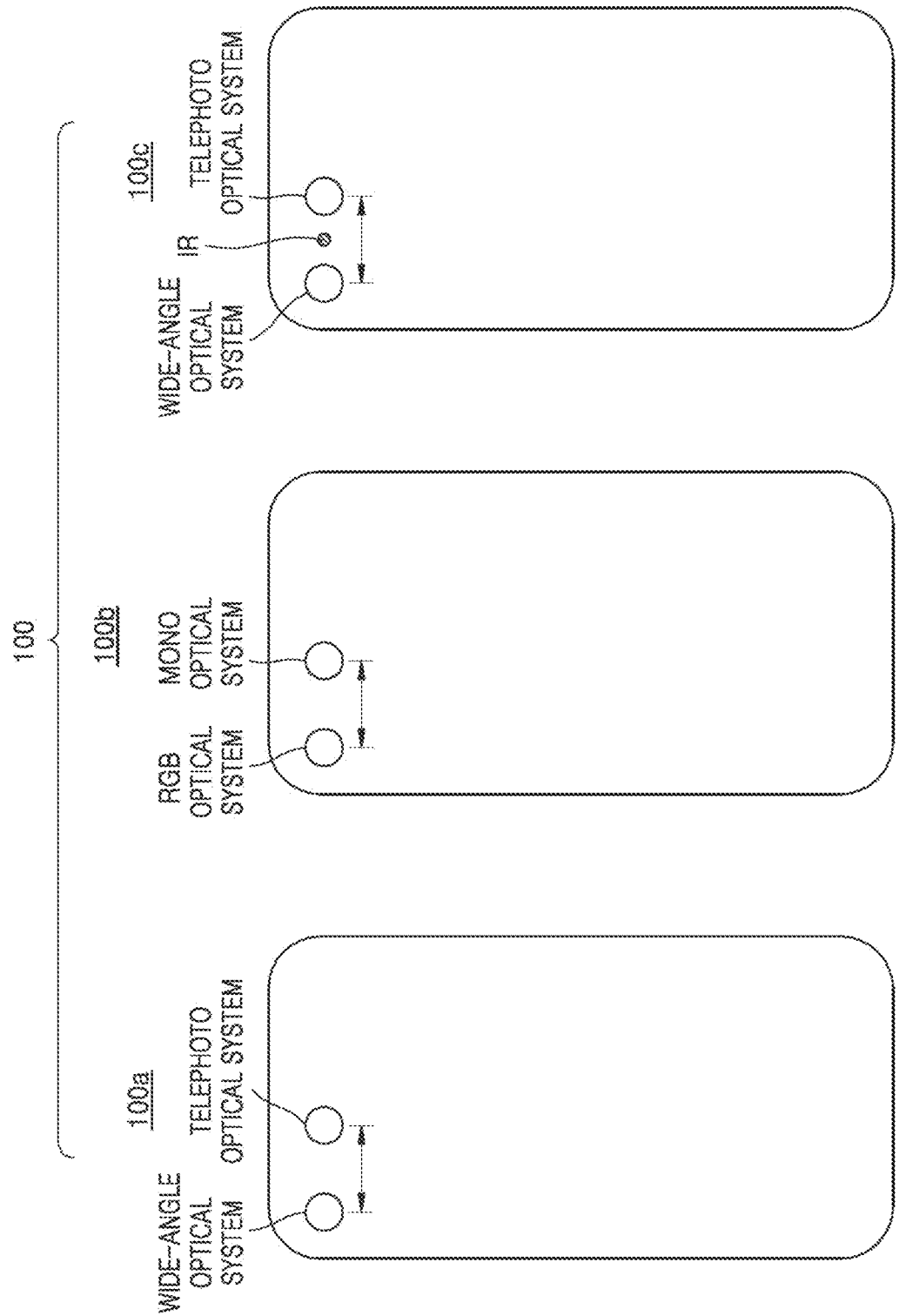
FIG. 1 is a diagram illustrating example configurations of a digital photographing apparatus 100.

Reference will now be made in greater detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are described below, simply by referring to the figures, to explain various example aspects. As used herein, the term "and/or" includes any and all combinations of one or more of the associated listed items. Expressions such as "at least one of," when preceding a list of elements, modify the entire list of elements and do not modify the individual elements of the list.

Terms used herein will be described in brief before the detailed description of the disclosure.

As the terms used herein, so far as possible, are widely-used general terms selected in consideration of functions in the disclosed example embodiments; however, these terms may vary according to the intentions of those skilled in the art, the precedents, or the appearance of new technology. Also, in some cases, there may be terms that are arbitrarily selected, and the meanings thereof will be described in greater detail in the corresponding portions of the description of the disclosure. Therefore, the terms used herein are not simple terms and should be defined based on the meanings thereof and the overall description of the disclosure.

Throughout the disclosure, when something is referred to as "including" a component, another component may be further included unless specified otherwise. Also, as used herein, the terms "units" and "modules" may refer to units that perform at least one function or operation, and the units may be implemented as hardware (e.g., circuitry), firmware or software or a combination of hardware and software.

Hereinafter, example embodiments of the disclosure will be described in greater detail with reference to the accompanying drawings so that those of ordinary skill in the art may easily understand the disclosure. However, the disclosure may be embodied in many different forms and should not be construed as being limited to the example embodiments set forth herein. In addition, portions irrelevant to the description of the inventive concept may be omitted in the drawings for a clear description of the disclosure, and like reference numerals will denote like elements throughout the disclosure.

Herein, a digital photographing apparatus may include, for example, at least one of a smartphone, a tablet personal computer (PC), a video phone, an electronic-book (e-book) reader, a desktop PC, a laptop PC, a mobile medical equipment, a camera, a wearable device (e.g., a head-mounted device (HMD) such as electronic glasses or a smart watch), a closed-circuit television (CCTV), and a television (TV), or the like.

Hereinafter, example embodiments of the disclosure will be described with reference to the accompanying drawings.

FIG. 1 is a diagram illustrating various example configurations of a digital photographing apparatus 100.

The digital photographing apparatus 100 may include a lens and an image sensor and generate an image by photographing a subject. For example, the digital photographing apparatus 100 may include a smartphone, a tablet PC, a CCTV, and a TV, or the like, and the disclosure will be understood to not be limited thereto.

The digital photographing apparatus 100 may include, for example, an asymmetric optical system and may acquire an image using the asymmetric optical system. For example, an optical system may include at least one lens and an image sensor and acquire an image signal through the image sensor. The asymmetric optical system may include two optical systems having properties differing from each other.

For example, the asymmetric optical system may include an optical system configured to acquire a wide-angle image and an optical system configured to acquire a telephoto image. As another example, the asymmetric optical system may include an optical system configured to acquire a color image and an optical system configured to acquire a black-and-white image. As another example, the asymmetric optical system may include a dual optical system and an active sensor (e.g., an infrared (IR) sensor or a time-of-flight (TOF) sensor) configured acquire distance information using an active mode.

The asymmetric optical system may be included in the digital photographing apparatus 100, or may be configured as a separate detachable device, By using the asymmetric optical system, the digital photographing apparatus 100 may capture still images and moving images (videos) including panoramic images and consecutive (burst) images.

In consideration of photographing conditions such as an illuminance of the subject, a distance between the digital photographing apparatus 100 and the subject, and a photographing mode thereof, the digital photographing apparatus 100 may determine which of the images acquired from the asymmetric optical system will be displayed.

Also, for example, in consideration of the illuminance of the subject, the distance between the digital photographing apparatus 100 and the subject, and the photographing mode, the digital photographing apparatus 100 may determine whether to synthesize the images acquired from different portions of the asymmetric optical system.

Information including the illuminance of the subject, the distance between the digital photographing apparatus 100 and the subject, and the photographing mode may, for example, be referred to as photographing environment information. The photographing environment information may be acquired from the sensors of the digital photographing apparatus 100. The sensors for acquiring the photographing environment information may include, for example, an illumination sensor (not illustrated), an auto exposure (AE) sensor (not illustrated), and an auto focusing (AF) sensor (not illustrated).

Also, in consideration of a current residual battery capacity thereof, the digital photographing apparatus 100 may determine whether to synthesize the images acquired from the asymmetric optical system based on a power level or power mode, A digital photographing apparatus 100a of FIG. 1 includes an asymmetric optical system according to an example embodiment.

Referring to FIG. 1, the digital photographing apparatus 100a may include, for example, an asymmetric optical system including a wide-angle optical system configured to acquire a wide-angle image and a telephoto optical system configured to acquire a telephoto image with the subject zoomed.

According to an example embodiment, the wide-angle optical system may include a wide-angle lens and the telephoto optical system may include a telephoto lens.

The wide-angle lens included in the wide-angle optical system may have a shorter focal length than the telephoto lens included in the telephoto optical system. For example, the focal length may refer to the distance from the center of the lens to the image sensor. The wide-angle lens included in the wide-angle optical system may have a focal length of, for example, about 10 mm to about 30 mm. The telephoto lens included in the telephoto optical system may have a focal length of, for example, about 30 mm to about 500 mm.

The above focal lengths of the wide-angle lens and the telephoto lens are merely examples and may vary according to various embodiments.

The digital photographing apparatus 100a may acquire the wide-angle image and the telephoto image simultaneously, or may acquire only one of the wide-angle image and the telephoto image.

The digital photographing apparatus 100a may display at least one of the wide-angle image and the telephoto image based on one or more of the position of the subject, the illuminance of the subject, and an input (e.g., a user input). Also, the digital photographing apparatus 100a may display a synthesized image of the wide-angle image and the telephoto image by synthesizing the wide-angle image and the telephoto image.

The digital photographing apparatus 100a may determine whether to synthesize the wide-angle image and the telephoto image based on one or more of the illuminance of the subject and the distance between the digital photographing apparatus 100a and the subject.

For example, if the illuminance of the subject is too low (e.g., below or less than a predetermined threshold value), when the digital photographing apparatus 100a synthesizes the wide-angle image and the telephoto image, a noise may be amplified in the synthesized image thereof. In this example, the digital photographing apparatus 100a may not synthesize the wide-angle image and the telephoto image.

The illuminance of the subject may refer to the illuminance of the entire subject to be photographed, and particularly in the telephoto image, it may be determined in consideration of the illuminance of a main subject included in a region or interest (ROI).

According to an example embodiment, the digital photographing apparatus 100a may determine whether to synthesize the wide-angle image and the telephoto image based on the length of a baseline that is equal to the distance between the two optical systems.

Since the wide-angle optical system and the telephoto optical system are spaced apart from each other by the distance equal to the length of the baseline, the digital photographing apparatus 100a may acquire the wide-angle image and the telephoto image at different viewpoints (visual points). Thus, when the distance of the subject is too small in comparison to the length of the baseline, an occlusion may occur in each of the wide-angle image and the telephoto image. In this example, the digital photographing apparatus 100a may not synthesize the wide-angle image and the telephoto image.

The above arrangement of the wide-angle optical system and the telephoto optical system in the digital photographing apparatus 100a of FIG. 1 is merely an example embodiment, and the disclosure is not limited thereto.

A digital photographing apparatus 100b of FIG. 1 includes an asymmetric optical system according to another example embodiment.

Referring to FIG. 1, the digital photographing apparatus 100b may include, for example, an asymmetric optical system including a red/green/blue (RGB) optical system configured to acquire a color image and a monochromatic optical system configured to acquire a black-and-white image. Hereinafter, for convenience and ease of explanation, the term "mono" may be used to refer to a monochromatic optical system, e.g., an optical system configured to acquire a black-and-white image.

An image sensor of the RGB optical system may include a color filter to recognize red, green, and blue colors. An image sensor of the mono optical system may not include a color filter because it acquires an image by recognizing the luminance of the subject. When the RGB optical system and the mono optical system acquire images of the same resolution, the image sensor of the RGB optical system including the color filter may require about four times more light than the image sensor of the mono optical system.

The digital photographing apparatus 100b may acquire the color image and the black-and-white image simultaneously, or may acquire only one of the color image and the black-and-white image.

The digital photographing apparatus 100b may display one or more of the color image and the black-and-white image based on at least one of the illuminance of the subject and an input (e.g., a user input). Also, the digital photographing apparatus 100b may display a synthesized image of the color image and the black-and-white image by synthesizing the color image and the black-and-white image.

The digital photographing apparatus 100b may determine whether to synthesize the color image and the black-and-white image based on the illuminance of the subject. For example, when the illuminance of the subject is a low (e.g., having an illuminance value below or less than a predetermined threshold value) illuminance and RGB signal data included in the color image is greater than or equal to a predetermined value, the digital photographing apparatus 100b may synthesize the color image and the black-and-white image. In this example, when the color image and the black-and-white image are synthesized, an image with a reduced noise may be acquired.

However, when the illuminance of the subject is a low (e.g., below or less than a predetermined threshold value) illuminance and is not sufficient to detect colors from the RGB optical system acquiring the color image, information about the colors of the subject included in the color image may not be accurate. In this example, when the digital photographing apparatus 100b synthesizes the color image and the black-and-white image, a noise may be amplified in the synthesized image. In this example, the digital photographing apparatus 100b may not synthesize the color image and the black-and-white image.

The above arrangement of the RGB optical system and the mono optical system in the digital photographing apparatus 100b of FIG. 1 is merely an example embodiment, and it will be understood that the disclosure is not limited thereto.

Unlike in the example embodiment illustrated in the digital photographing apparatus 100b of FIG. 1, the RGB optical system and the mono optical system may be implemented in one optical system and the color image and the black-and-white image may be acquired through one image sensor.

A digital photographing apparatus 100c of FIG. 1 includes an asymmetric optical system according to another example embodiment.

Referring to FIG. 1 the digital photographing apparatus 100c may include an asymmetric optical system including a dual optical system and an active sensor.

The active sensor may refer to a sensor configured to acquire distance information of the subject by using an active mode. The active mode may refer to a mode in which the active sensor emits a light or an electromagnetic wave to the subject and acquires the light or the electromagnetic wave reflected from the subject to acquire distance information of the subject. A depth map acquired by using the active sensor may be referred to as a first depth map.

Also, herein, the dual optical system may refer to two optical systems disposed at a certain distance therebetween. The dual optical system may photograph the subject at different viewpoints to acquire a depth map representing the distance between the digital photographing apparatus 100c and the subject. A depth map acquired using the dual optical system may be referred to as a second depth map.

FIG. 1 illustrates that the active sensor of the digital photographing apparatus 100c is an IR sensor. However, this is merely an example, and the active sensor of the digital photographing apparatus 100c may be, for example, a structured light sensor, a TOF sensor, a radar sensor, or a lidar (light detection and ranging) sensor, or the like.

The digital photographing apparatus 100c may determine whether to synthesize the first depth map and the second depth map based on one or more of the illuminance of the subject and the photographing mode of the digital photographing apparatus 100c.

For example, when the illuminance of the subject is greater than a first illuminance for enabling the active sensor to sense the light reflected from the subject, the active sensor of the digital photographing apparatus 100c may not accurately sense the light reflected from the subject. In this example, the digital photographing apparatus 100c may determine not to generate a synthesized depth map and may acquire the first depth map.

FIG. 1 illustrates that the dual optical system of the digital photographing apparatus 100c includes a wide-angle optical system and a telephoto optical system. However, the dual optical system of the digital photographing apparatus 100c illustrated in FIG. 1 is merely an example embodiment, and it will be understood that the disclosure is not limited thereto. For example, the dual optical system of the digital photographing apparatus 100c may be an asymmetric optical system including an RGB optical system and a mono optical system, or may be certain optical systems that are not asymmetric optical systems.

The above arrangements of the asymmetric optical systems of the digital photographing apparatus 100a, the digital photographing apparatus 100b, and the digital photographing apparatus 100c illustrated in FIG. 1 are merely examples, and it will be understood that the disclosure is not limited thereto. For example, the asymmetric optical system of the digital photographing apparatus 100 may include 4, 5, or 6 optical systems, and the digital photographing apparatus 100 may be configured to include all of the wide-angle optical system, the telephoto optical system, the RGB optical system, the mono optical system, and the active sensor.

Figure 2:
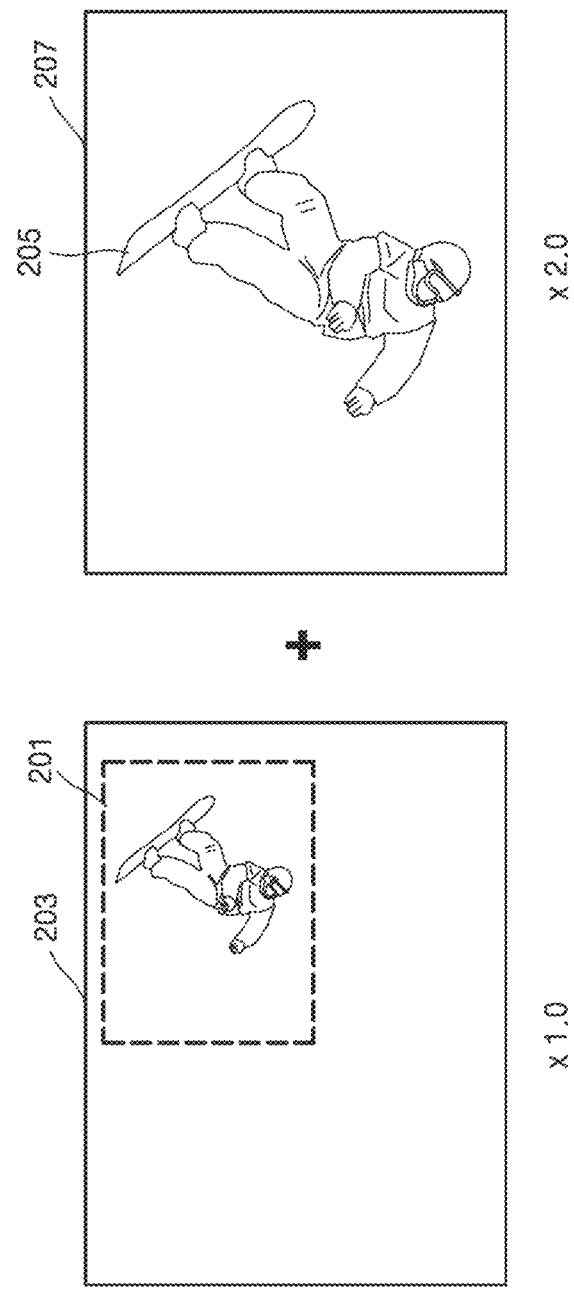
FIG. 2 includes diagrams illustrating an example of a wide-angle image and a telephoto image acquired by the digital photographing apparatus 100.

FIG. 2 is a diagram illustrating an example of a wide-angle image and a telephoto image acquired by the digital photographing apparatus 100.

Referring to FIG. 2, the digital photographing apparatus 100 may acquire a wide-angle image 203 and a telephoto image 207 in which an ROI 201 of the wide-angle image 203 is magnified. FIG. 2 illustrates a case where the telephoto image 207 is magnified two times in comparison to the wide-angle image 203.

The wide-angle image 203 may have a greater depth than the telephoto image 207. For example, the wide-angle image 203 may clearly represent various subjects that are at different distances from the digital photographing apparatus 100.

The telephoto image 207 may have a relatively small depth. For example, the telephoto image 207 may clearly represent a main subject 205 that is focused and may unclearly represent a background and other subjects that are at different distances from the main subject 205.

For example, when the illuminance is greater than a critical subject illuminance, the digital photographing apparatus 100 may determine to generate a synthesized image of the wide-angle image 203 and the telephoto image 207 by synthesizing the wide-angle image 203 and the telephoto image 207.

For example, the critical subject illuminance may refer to an illuminance in a case where a noise caused by the synthesis of the wide-angle image 203 and the telephoto image 207 becomes greater than a noise existing in the original image.

When the illuminance is less than or equal to the critical subject illuminance, the synthesized image may have a lower image quality than the wide-angle image 203 and the telephoto image 207 before synthesis. Therefore, when the illuminance is less than or equal to the critical subject illuminance, the digital photographing apparatus 100 may not generate the synthesized image, which may be effective in terms of the power consumption and the usability thereof.

For example, when the distance between the digital photographing apparatus 100 and the main subject 205 is within a perspective mode range, the digital photographing apparatus 100 may determine to generate the synthesized image.

For example, the perspective mode range may refer to an example where an occlusion does not occur because the distance between the digital photographing apparatus 100 and the main subject 205 is sufficiently great in comparison to the length of the baseline.

When the distance between the digital photographing apparatus 100 and the main subject 205 is out of (or less than) the perspective mode range, the digital photographing apparatus 100 may determine not to generate the synthesized image.

Figure 3:
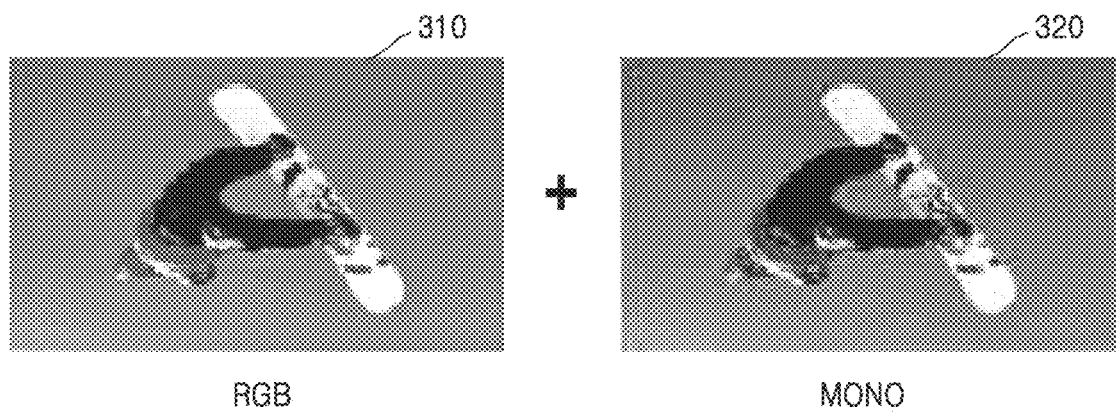
FIG. 3 includes diagrams illustrating an example of a color image and a black-and-white image acquired by the digital photographing apparatus 100.

FIG. 3 includes diagrams illustrating an example of a color image and a black-and-white image acquired by the digital photographing apparatus 100.

A color image 310 may include information about the colors of the subject, and the information about the colors of the subject may include, for example, numerical values of red, green, and blue colors.

A black-and-white image 320 may include, for example, information about the luminance of the subject and may not include information about the colors thereof. Also, the black-and-white image 320 may have an excellent signal-to-noise ratio (SNR) in comparison to the color image 310.

According to an example embodiment, when the illuminance of the subject is a low (e.g., below or less than a predetermined threshold value) illuminance and RGB signal data included in the color image 310 is greater than or equal to a predetermined value, the digital photographing apparatus 100 may determine to generate a synthesized image of the color image 310 and the black-and-white image 320 by synthesizing the color image 310 and the black-and-white image 320.

For example, the case of the illuminance of the subject being a low illuminance may refer to a case where the illuminance of the subject is not sufficiently high and thus the color image 310 has a lower SNR than the black-and-white image 320.

The case of the RGB signal data included in the color image 310 being greater than or equal to a predetermined value may refer to a case where the numerical values of red, green, and blue colors are sufficient to acquire the colors of the subject by the digital photographing apparatus 100.

When the illuminance of the subject is a low illuminance and the RGB signal data included in the color image 310 is greater than or equal to a predetermined value, the digital photographing apparatus 100 may acquire an image having a smaller noise than the color image 310 by synthesizing the color image 310 including information about the colors of the subject and the black-and-white image 320 having an excellent SNR.

However, there may be an example where the illuminance is too low for the digital photographing apparatus 100 to detect colors from the RGB optical system acquiring the color image. For example, when the RGB signal data included in the color image 310 is less than a predetermined value, it may be difficult for the digital photographing apparatus 100 to detect the colors of the subject using the RGB signal data. This example may be referred to as an ultra-low illuminance.

According to an example embodiment, when the illuminance of the subject is an ultra-low illuminance, the numerical values of the red, green, and blue colors of the subject included in the color image 310 may not be accurate. In this example, when the digital photographing apparatus 100 synthesizes the color image 310 and the black-and-white image 320, a noise may be amplified in the synthesized image thereof. In this example, the digital photographing apparatus 100 may not synthesize the color image 310 and the black-and-white image 320 and may display only the black-and-white image 320 including the luminance information thereof.

Figure 4:
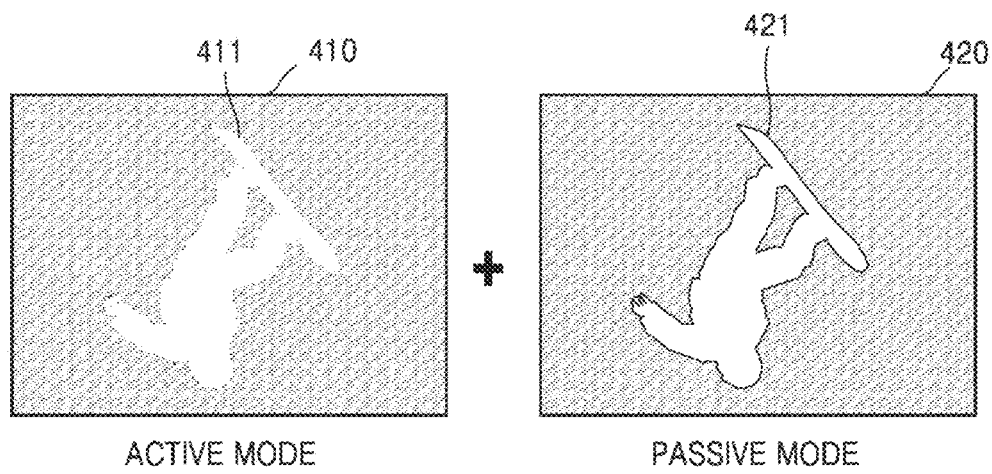
FIG. 4 includes diagrams illustrating an example of a first depth map and a second depth map acquired by the digital photographing apparatus 100.

FIG. 4 includes diagrams illustrating an example of a first depth map 410 and a second depth map 420 acquired by the digital photographing apparatus 100.

According to an example embodiment, the digital photographing apparatus 100 may acquire the first depth map 410 from the active sensor configured to transmit a light, electromagnetic wave, or the like, to the subject and receive the reflected light, electromagnetic wave, or the like, thereof to acquire distance information about the subject.

The digital photographing apparatus 100 may acquire the second depth map 420 from two optical systems. There may be a parallax (or a viewpoint difference) between two images acquired from two different optical systems. The digital photographing apparatus 100 may determine the distance between the subjects in the image using the parallax between the two images. The digital photographing apparatus 100 may generate the second depth map 420 based on the determined distance between the subjects.

The digital photographing apparatus 100 may determine whether to synthesize the first depth map 410 and the second depth map 420 based on at least one of the illuminance of the subject and the photographing mode of the digital photographing apparatus 100.

For example, when the illuminance of the subject is greater than a first illuminance for enabling the active sensor to sense the fight reflected from the subject, the active sensor of the digital photographing apparatus 100 may not accurately sense the light reflected from the subject. In this example, the digital photographing apparatus 100 may determine not to generate a synthesized depth map and may acquire the second depth map 420.

When the position of the subject is too distant and thus a great error occurs in the process of sensing the light reflected from the subject by the active sensor, the active sensor of the digital photographing apparatus 100 may not accurately sense the distance information of the subject. In this example, the digital photographing apparatus 100 may determine not to generate a synthesized depth map and may acquire the second depth map 420.

The case where the distance between the digital photographing apparatus 100 and the subject is too great and thus a great error occurs in the process of sensing the light reflected from the subject by the active sensor may, for example, be referred to as a perspective mode in the process of generating the synthesized depth map.

Referring to FIG. 4, the digital photographing apparatus 100 may determine ROIs 411 and 421 as the brightest regions. The ROIs 411 and 421 may include a main subject.

According to an example embodiment, the digital photographing apparatus 100 may acquire motion information of the main subject based on a change in at least one of the brightness and the size of the ROIs 411 and 421 in the depth map.

Figure 5:
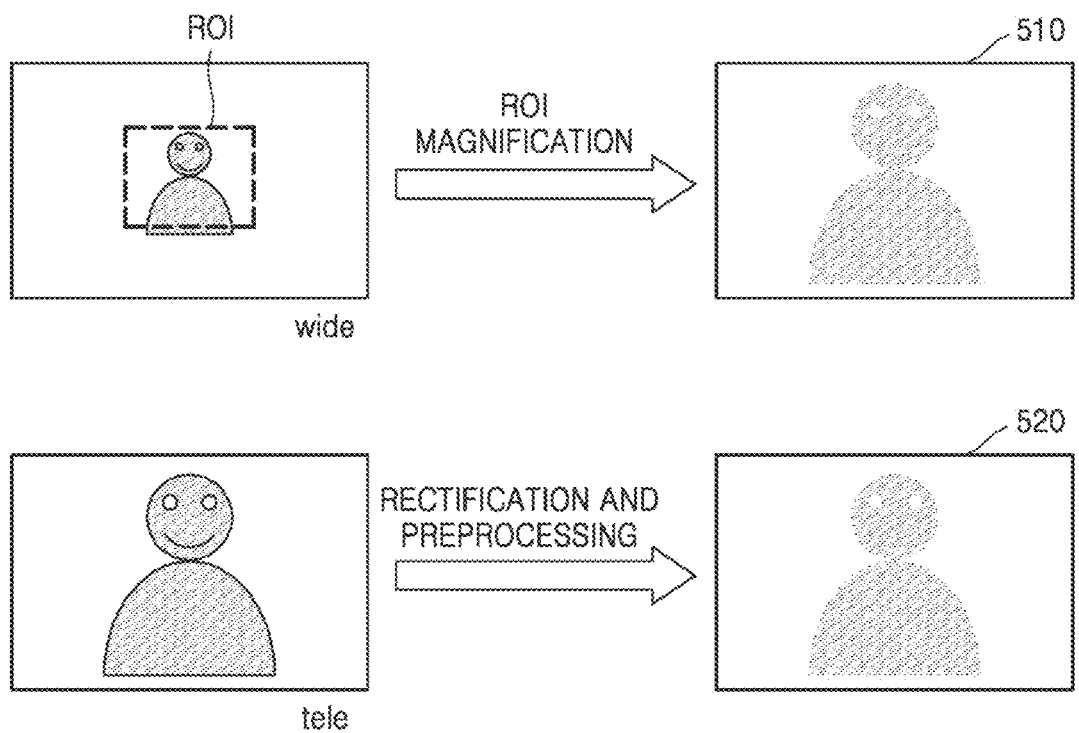
FIG. 5 includes diagrams illustrating examples of synthesizing a wide-angle image and a telephoto image by the digital photographing apparatus 100.

FIG. 5 include diagrams illustrating an example of synthesizing a wide-angle image and a telephoto image by the digital photographing apparatus 100.

For example, the digital photographing apparatus 100 may magnify an ROI of the wide-angle image to adjust the same in accordance with the size of the telephoto image. This process may be referred to as an upscale of the wide-angle image.

The digital photographing apparatus 100 may acquire the wide-angle image and the telephoto image at different viewpoints. In the process of synthesizing the wide-angle image and the telephoto image, the digital photographing apparatus 100 may need to modify the viewpoint of the telephoto image in accordance with the wide-angle image. This process may, for example, be referred to as the rectification of the telephoto image.

For example, the digital photographing apparatus 100 may adjust the brightness, definition, and contrast of the telephoto image in accordance with a first image 510 that is the upscaled wide-angle image. This process may, for example, be referred to as the preprocessing of the telephoto image.

For example, in the process of synthesizing the telephoto image and the wide-angle image, the digital photographing apparatus 100 may synthesize the first image 510 that is the upscaled wide-angle image and a second image 520 that is obtained by rectifying and preprocessing the telephoto image.

In the following description of the synthesis of the telephoto image and the wide-angle image by the digital photographing apparatus 100, descriptions of the processes of upscaling the telephoto image and rectifying and preprocessing the wide-angle image will be omitted for conciseness.

Figure 6A:
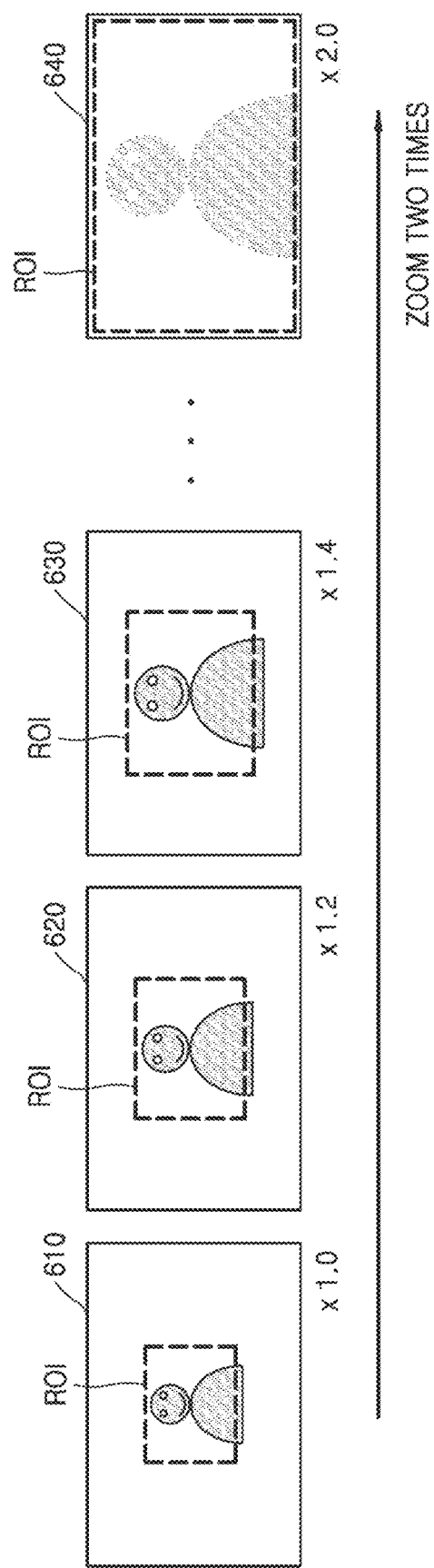
FIG. 6A is a diagram illustrating an example process of magnifying a synthesized image 610 two times by the digital photographing apparatus 100.

FIG. 6A includes diagrams illustrating an example process of magnifying a synthesized image 610 two times by the digital photographing apparatus 100.

The digital photographing apparatus 100 may display a synthesized image 610 of the wide-angle image and the telephoto image by synthesizing the wide-angle image and the telephoto image. For example, an ROI in the synthesized image 610 may correspond to a synthesized region of the wide-angle image and the telephoto image, and a region other than the ROI may be equal to that of the wide-angle image before the magnification.

The digital photographing apparatus 100 may generate a 2-time magnified image 640 by magnifying the synthesized image 610 gradually from the original image size.

For example, the digital photographing apparatus 100 may perform sub-processes of generating and displaying a 1.2-time magnified image 620 and a 1.4-time magnified image 630 in the process of magnifying the synthesized image 610. Thereafter, the digital photographing apparatus 100 may display the final 2-time magnified image 640.

Referring to FIG. 6A, in the 1.2-time magnified image 620 and the 1.4-time magnified image 630, an ROI may correspond to a synthesized region of the wide-angle image and the telephoto image.

According to an example embodiment, when there is a 2-time scale difference between the telephoto image and the wide-angle image before the magnification in the digital photographing apparatus 100, the final 2-time magnified image 640 may be equal to the telephoto image.

Figure 6B:
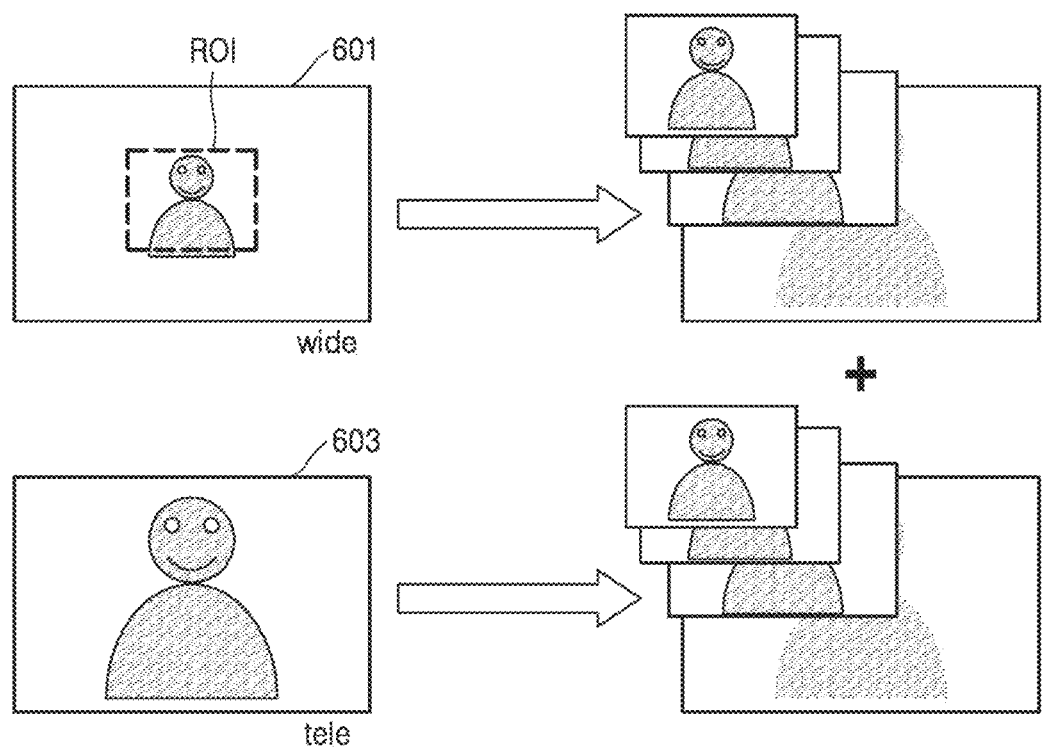
FIG. 6B includes diagrams illustrating examples of synthesizing a wide-angle image and a telephoto image at various scales by the digital photographing apparatus 100.

FIG. 6B includes diagrams illustrating an example of synthesizing a wide-angle image and a telephoto image at various scales by the digital photographing apparatus 100.

For example, according to an example embodiment, the digital photographing apparatus 100 may generate a 2-time magnified image through the sub-processes of generating a 1.2-time magnified image and a 1.4-time magnified image in the process of magnifying a 1-time scale image into a 2-time scale image. According to an example embodiment, the 2-time magnified image generated by the digital photographing apparatus 100 may be equal to a telephoto image 603.

In order to display mufti-scale images of various scales between a 1-time scale and a 2-time scale in the process of magnifying a 1-time scale image into a 2-time scale image, the digital photographing apparatus 100 may generate mufti-scale synthesized images of various scales by synthesizing a wide-angle image 601 and the telephoto image 603 at various scales (multi-scales).

Figure 7:
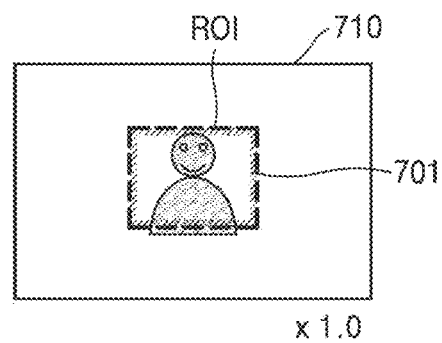
FIG. 7 is a diagram illustrating an example synthesized image obtained by synthesizing a wide-angle image and a telephoto image by the digital photographing apparatus 100.

FIG. 7 is a diagram illustrating an example synthesized image obtained by synthesizing a wide-angle image and a telephoto image by the digital photographing apparatus 100.

The digital photographing apparatus 100 may display a synthesized image 710 of the wide-angle image and the telephoto image by synthesizing the wide-angle image and the telephoto image. For example, an ROI in the synthesized image 710 may correspond to a synthesized region of the wide-angle image and the telephoto image, and a region other than the ROI may be equal to that of the original wide-angle image.

Since the ROI in the synthesized image 710 corresponds to the synthesized region of the wide-angle image and the telephoto image, there may be a resolution difference between the ROI and the region other than the ROI. In order to naturally display a boundary 701 between the ROI and the region other than the ROI, the digital photographing apparatus 100 may apply, for example, alpha blending to the vicinity of the boundary 701.

Figure 8:
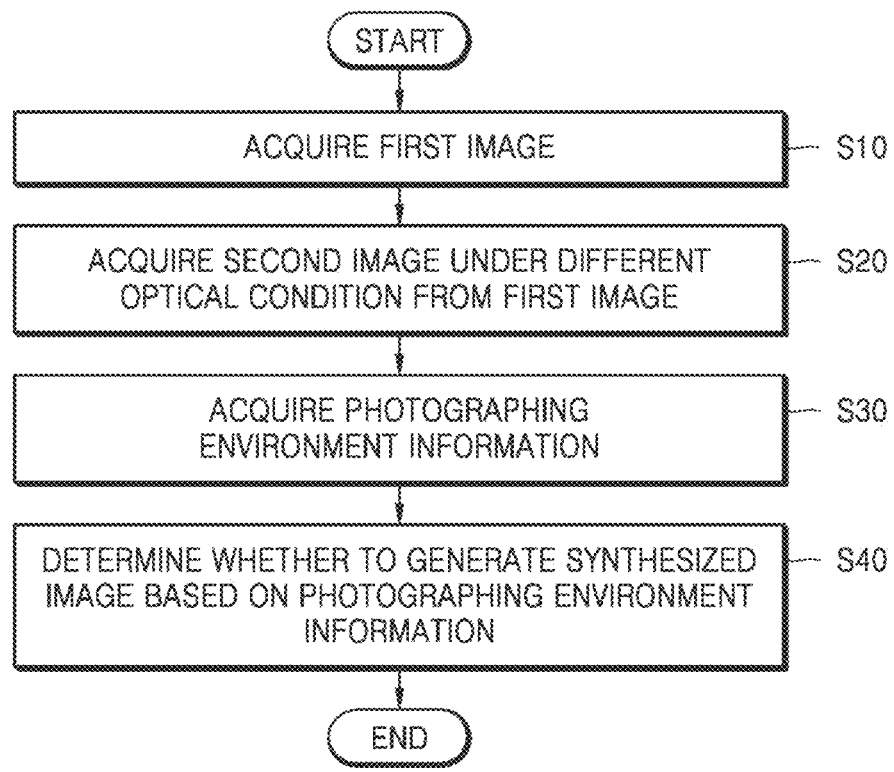
FIG. 8 is a flowchart illustrating an example method of operating the digital photographing apparatus 100.

FIG. 8 is a flowchart illustrating an example method of operating the digital photographing apparatus 100.

In operation S10, the digital photographing apparatus 100 may acquire a first image.

In operation S20, the digital photographing apparatus 100 may acquire a second image under a different optical condition from the first image.

In operation S30, the digital photographing apparatus 100 may acquire photographing environment information. According to an example embodiment, the photographing environment information may include one or more of the distance and the illuminance of the subject.

In operation S40, the digital photographing apparatus 100 may determine whether to generate a synthesized image based on the photographing environment information.

Figure 9:
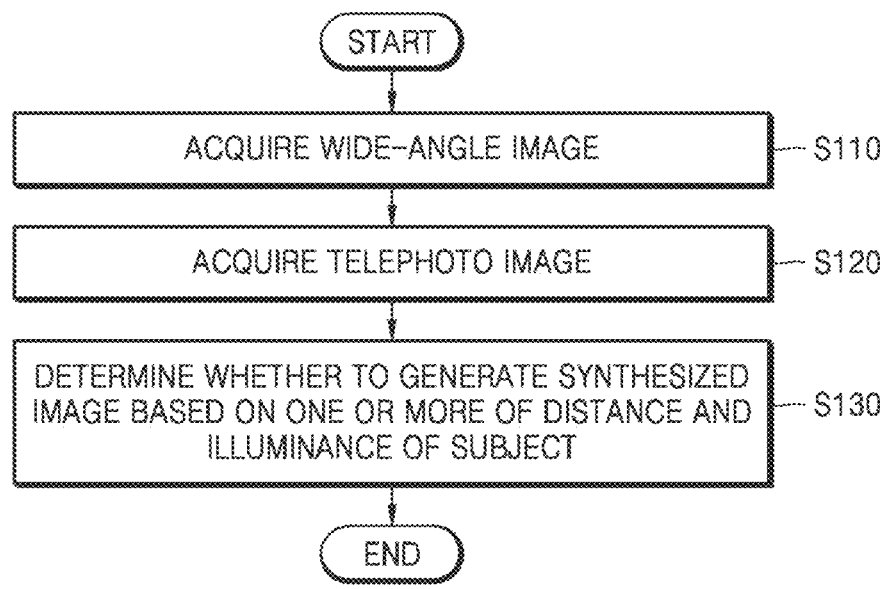
FIG. 9 is another flowchart illustrating an example method of operating the digital photographing apparatus 100.

FIG. 9 is another flowchart illustrating an example method of operating the digital photographing apparatus 100.

In operation S110, the digital photographing apparatus 100 may acquire a wide-angle image.

In operation S120, the digital photographing apparatus 100 may acquire a telephoto image. The telephoto image may refer, for example, to an image in which the subject included in the wide-angle image is magnified.

In operation S130, the digital photographing apparatus 100 may determine whether to generate a synthesized image based on one or more of the distance and the illuminance of the subject.

For example, the synthesized image may refer, for example, to an image that is obtained by synthesizing the wide-angle image and the telephoto image. Also, the illuminance of the subject may include both the illuminance of the main subject photographed by the digital photographing apparatus 100 and the illuminance of the background photographed by the digital photographing apparatus 100. Also, the distance of the subject may refer to the distance between the digital photographing apparatus 100 and the subject.

Figure 10:
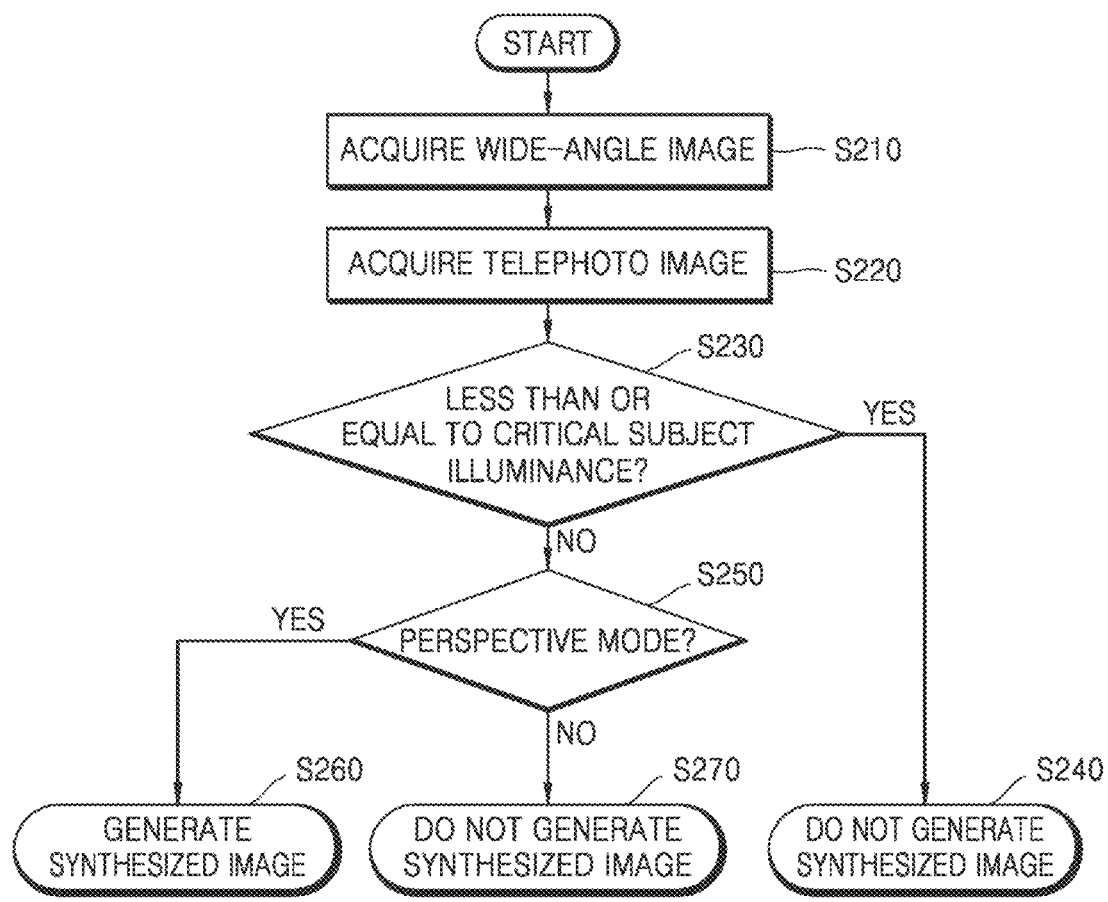
FIG. 10 is another flowchart illustrating an example method of operating the digital photographing apparatus 100.

FIG. 10 is another flowchart illustrating an example method of operating the digital photographing apparatus 100.

In operation S210, the digital photographing apparatus 100 may acquire a wide-angle image.

In operation S220, the digital photographing apparatus 100 may acquire a telephoto image. For example, the telephoto image may refer, for example, to an image in which the subject included in the wide-angle image is magnified.

In operation S230, the digital photographing apparatus 100 may determine whether the illuminance of the subject is less than or equal to a critical subject illuminance.

For example, the illuminance of the subject may include both the illuminance of the main subject photographed by the digital photographing apparatus 100 and the illuminance of the background photographed by the digital photographing apparatus 100.

Also, the critical subject illuminance may refer, for example, to an illuminance in a case where a noise caused by the synthesis of the wide-angle image and the telephoto image by the digital photographing apparatus 100 becomes greater than a noise existing in the original image.

According to an example embodiment, when the illuminance of the subject is less than or equal to the critical subject illuminance, since the synthesized image may have a lower image quality than the wide-angle image 210 and the telephoto image 220 before the synthesis thereof, the digital photographing apparatus 100 may not generate the synthesized image, which may be advantageous in terms of the image quality and the power consumption thereof.

When determining that the illuminance of the subject is less than or equal to the critical subject illuminance (in operation S230), in operation S240, the digital photographing apparatus 100 may determine not to generate the synthesized image.

On the other hand, when determining that the illuminance of the subject is greater than the critical subject illuminance (in operation S230), in operation S250, the digital photographing apparatus 100 may determine whether the photographing mode of the digital photographing apparatus 100 is a perspective mode.

When determining that the digital photographing apparatus 100 is in the perspective mode (in operation S250), in operation S260, the digital photographing apparatus 100 may determine to generate the synthesized image.

The perspective mode range may refer, for example, to a distance range in which an occlusion does not occur because the distance between the digital photographing apparatus 100 and the main subject is sufficiently great in comparison to the length of the baseline.

On the other hand, when determining that the digital photographing apparatus 100 is not in the perspective mode (in operation S250), in operation S270, the digital photographing apparatus 100 may determine not to generate the synthesized image.

According to an example embodiment, when the distance between the digital photographing apparatus 100 and the main subject is not within the perspective mode range, an occlusion may occur because the distance of the main subject is not sufficiently great in comparison to the length of the baseline.

For example, the degree of the main subject covering the background may be greatly different between the wide-angle image and the telephoto image. In this example, since there is a high probability of an image synthesis error occurring in the process of generating the synthesized image, the digital photographing apparatus 100 may determine not to generate the synthesized image.

Figure 11:
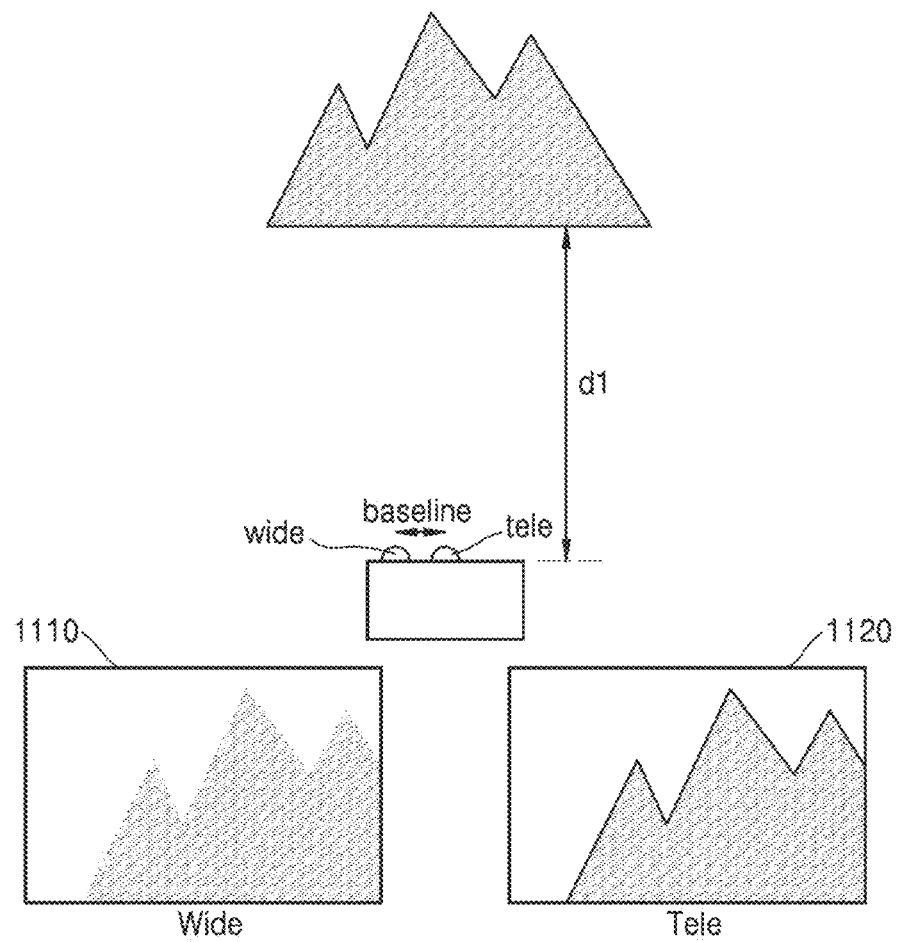
FIG. 11 is a diagram illustrating an example method of operating the digital photographing apparatus 100.

FIG. 11 is a diagram illustrating an example case where the digital photographing apparatus 100 is in a telephoto mode.

According to an example embodiment, when a distance $d_1$ between the digital photographing apparatus 100 and the subject is within the perspective mode range, the digital photographing apparatus 100 may determine to generate a synthesized image of a wide-angle image 1110 and a telephoto image 1120 by synthesizing the wide-angle image 1110 and the telephoto image 1120.

The perspective mode range may refer, for example, to a distance range between the digital photographing apparatus 100 and the subject, in which an occlusion does not occur because the distance $d_1$ between the digital photographing apparatus 100 and the main subject is sufficiently great in comparison to the length of the baseline.

When the distance $d_1$ between the digital photographing apparatus 100 and the subject is out of (or less than) the perspective mode range, the digital photographing apparatus 100 may determine not to generate the synthesized image.

For example, when the length of the baseline is about 8 mm and the distance $d_1$ between the digital photographing apparatus 100 and the subject is greater than or equal to about 3 m, the digital photographing apparatus 100 may determine that the distance $d_1$ is within the perspective mode range.

Figure 12:
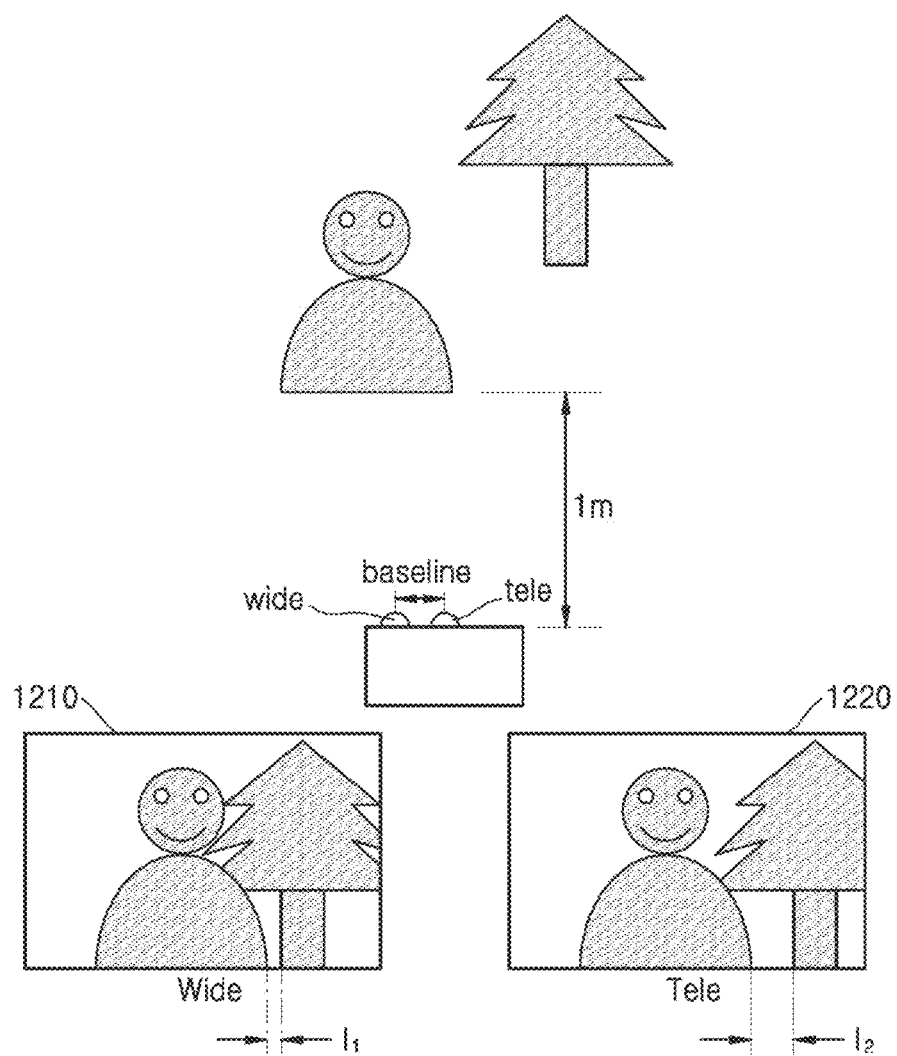
FIG. 12 is another diagram illustrating an method of operating the digital photographing apparatus 100.

FIG. 12 is a diagram illustrating an example case where the photographing mode of the digital photographing apparatus 100 is a close-up photographing mode.

When determining that the digital photographing apparatus 100 is not in the perspective mode, the digital photographing apparatus 100 may determine not to generate the synthesized image. The example of not being the perspective mode may include, for example, the example of being the close-up photographing mode or the macro mode.

Referring to FIG. 12, the digital photographing apparatus 100 may determine to display only a wide-angle image 1210 in the close-up photographing mode.

The close-up photographing mode may refer, for example, to the case of not being the macro mode while not being in the perspective mode range. According to the example embodiment illustrated in FIG. 12, when the distance between the digital photographing apparatus 100 and a main subject 1201 is about 1 m, the digital photographing apparatus 100 may determine that the digital photographing apparatus 100 is in the close-up photographing mode. In this example, an occlusion may occur because the distance between the digital photographing apparatus 100 and the main subject 1201 is not sufficiently great in comparison to the length of the baseline.

Referring to FIG. 12, a distance $l_1$ between the main subject 1201 and the background in the wide-angle image 1210 may be different in value from a distance $l2$ between the main subject and the background in a telephoto image 1220. For example, due to the occlusion, a portion of the background shown (or uncovered) in the wide-angle image 1210 may be different from a portion of the background shown in the telephoto image 1220.

According to an example embodiment, when the length of the baseline of the digital photographing apparatus 100 is about 8 mm and the distance between the digital photographing apparatus 100 and the main subject 1201 is about 1 m, the parallax of the main subject 1201 between the wide-angle image 1210 and the telephoto image 1220 acquired by the digital photographing apparatus 100 may, for example, be about 200 pixels.

Thus, when the digital photographing apparatus 100 is in the close-up photographing mode and the 200-pixel images included in the wide-angle image 1210 and the telephoto image 1220 are different from each other, it may be somewhat inefficient for the digital photographing apparatus 100 to synthesize the wide-angle image 1210 and the telephoto image 1220 and there may be a high probability of an error occurring therein.

Accordingly, the digital photographing apparatus 100 may determine not to generate the synthesized image in the close-up photographing mode. Also, when the digital photographing apparatus 100 is in the close-up photographing mode, the digital photographing apparatus 100 may determine to display only the wide-angle image 1210 in consideration of the user's usability.

Figure 13:
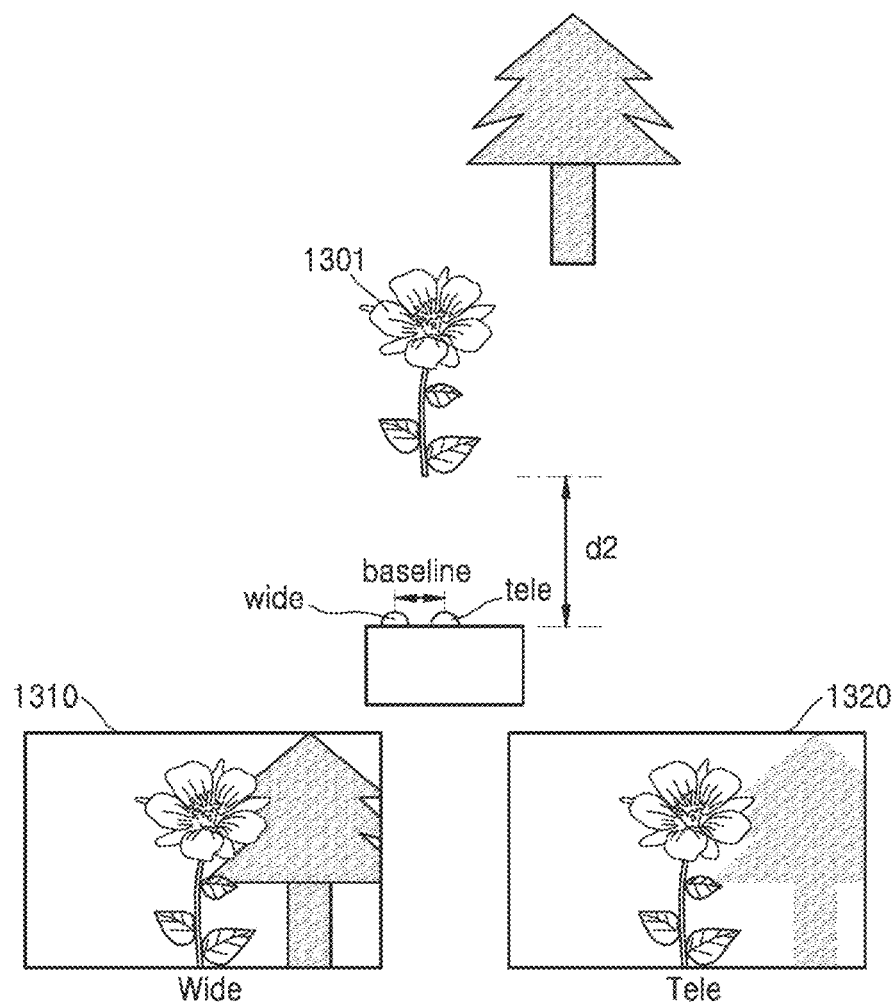
FIG. 13 is another diagram illustrating an example method of operating the digital photographing apparatus 100.

FIG. 13 is a diagram illustrating an example case where the photographing mode of the digital photographing apparatus 100 is a macro mode.

Referring to FIG. 13, the digital photographing apparatus 100 may display a wide-angle image 1310 having a great depth and may display a telephoto image 1320 having a small depth. For example, the wide-angle image 1310 may have a similar definition through the entire image, and the telephoto image 1320 may unclearly represent a background portion except a main subject 1301 while focusing on the main subject 1301.

When the digital photographing apparatus 100 is in the macro mode and a distance $d_2$ between the digital photographing apparatus 100 and the main subject 1301 is greater than or equal to a minimum photographing distance thereof, the digital photographing apparatus 100 may display only the telephoto image 1320. The minimum photographing distance in the macro mode may refer to a distance for enabling the closest photographing of the main subject 1301 with the telephoto optical system focused. The value of the minimum photographing distance may vary according to the lens performance and the focal length thereof and may range from about 5 cm to about 45 cm.

According to the example embodiment illustrated in FIG. 13, when the digital photographing apparatus 100 is in the macro mode and the distance $d_2$ between the digital photographing apparatus 100 and the main subject 1301 is greater than or equal to the minimum photographing distance, the digital photographing apparatus 100 may determine not to generate the synthesized image. Also, in this example, the digital photographing apparatus 100 may display the telephoto image 1320.

According to an example embodiment, when the distance $d_2$ between the digital photographing apparatus 100 and the main subject 1301 is less than the minimum photographing distance, the digital photographing apparatus 100 may synthesize the wide-angle image 1310 and the telephoto image 1320.

Figure 14:
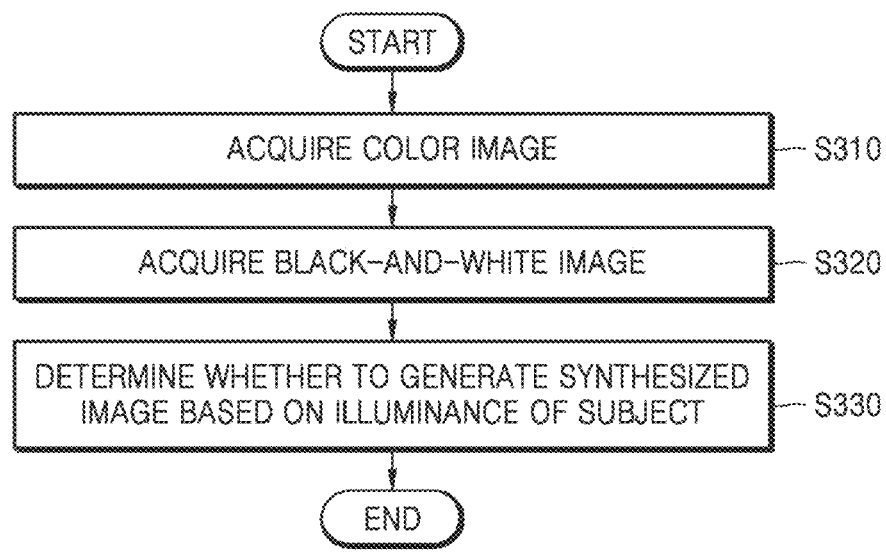
FIG. 14 is another flowchart illustrating an example method of operating the digital photographing apparatus 100.

FIG. 14 is another flowchart illustrating an example method of operating the digital photographing apparatus 100.

In operation S310, the digital photographing apparatus 100 may acquire a color image. For example, the digital photographing apparatus 100 may acquire the color image by using an optical system including an image sensor including a color filter configured to recognize red, green, and blue colors.

In operation S320, the digital photographing apparatus 100 may acquire a black-and-white image. For example, the digital photographing apparatus 100 may acquire the black-and-white image by using an optical system including an image sensor configured to recognize the luminance of the subject.

In operation S330, the digital photographing apparatus 100 may determine whether to generate a synthesized image based on the luminance of the subject. For example, the digital photographing apparatus 100 may determine whether to generate a synthesized image of the color image and the black-and-white image based on the illuminance of the subject.

For example, when the illuminance of the subject is a low (e.g., below or less than a predetermined threshold value) illuminance and the RGB signal data in the color image is greater than or equal to a predetermined value, the digital photographing apparatus 100 may synthesize the color image and the black-and-white image. In this example, when the color image and the black-and-white image are synthesized, an image with a reduced noise may be acquired.

Figure 15:
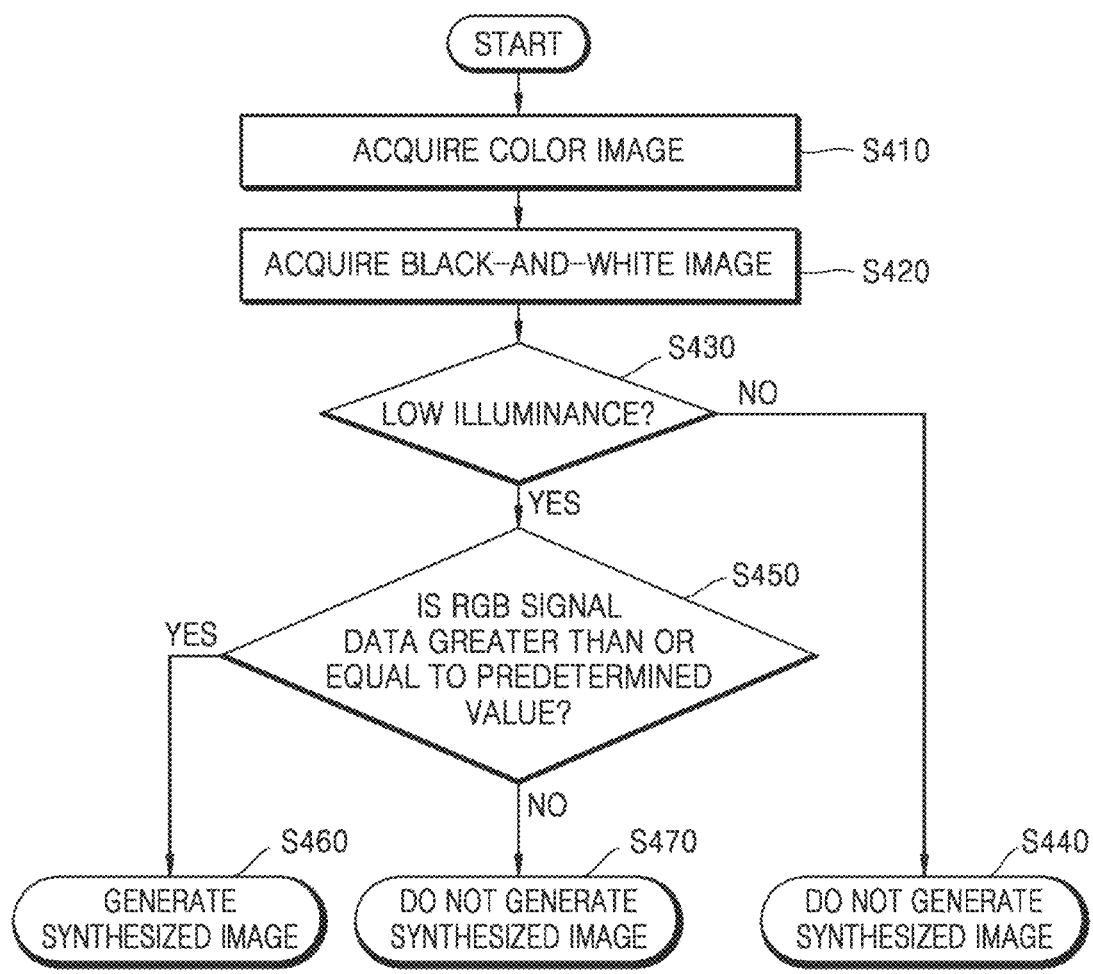
FIG. 15 is another flowchart illustrating an example method of operating the digital photographing apparatus 100.

FIG. 15 is another flowchart illustrating an example method of operating the digital photographing apparatus 100.

In operation S410, the digital photographing apparatus 100 may acquire a color image. For example, the digital photographing apparatus 100 may acquire the color image by using an optical system including an image sensor including a color filter configured to recognize red, green, and blue colors.

In operation S420, the digital photographing apparatus 100 may acquire a black-and-white image. For example, the digital photographing apparatus 100 may acquire the black-and-white image by using an optical system including an image sensor configured to recognize the luminance of the subject.

In operation S430, the digital photographing apparatus 100 may determine whether the illuminance of the subject is a low illuminance.

When determining that the illuminance of the subject is not a low illuminance (in operation S430), in operation S440, the digital photographing apparatus 100 may determine not to synthesize the color image and the black-and-white image. The case of the illuminance of the subject being a low illuminance may refer to a case where the illuminance of the subject is not sufficiently high and thus the color image has a lower SNR than the black-and-white image.

In this example, the digital photographing apparatus 100 may determine to display the color image. When the illuminance of the subject is not a low illuminance, the case of not synthesizing the color image and the black-and-white image may be efficient in terms of the power consumption.

When determining that the illuminance of the subject is a low illuminance (in operation S430), in operation S450, the digital photographing apparatus 100 may determine whether the RGB signal data in the color image is greater than or equal to a predetermined value.

Also, the case of the RGB signal data in the color image being greater than or equal to the predetermined value may refer to a case where the numerical values of red, green, and blue colors are sufficient to acquire the colors of the subject by the digital photographing apparatus 100.

When determining that the RGB signal data in the color image is greater than or equal to the predetermined value (in operation S450), in operation S460, the digital photographing apparatus 100 may determine to synthesize the color image and the black-and-white image.

In this example, the digital photographing apparatus 100 may acquire an image having a smaller noise than the color image by synthesizing the color image including information about the colors of the subject and the black-and-white image having an excellent SNR.

When determining that the RGB signal data in the color image is less than the predetermined value (in operation S450), in operation S470, the digital photographing apparatus 100 may determine not to synthesize the color image and the black-and-white image.

However, when the illuminance of the subject is a low illuminance and is not sufficient to detect colors from the RGB optical system acquiring the color image, information about the colors of the subject included in the color image may not be accurate. In this example, when the digital photographing apparatus 100 synthesizes the color image and the black-and-white image, a noise may be amplified in the synthesized image thereof. In this example, the digital photographing apparatus 100 may not synthesize the color image and the black-and-white image.

Figure 16:
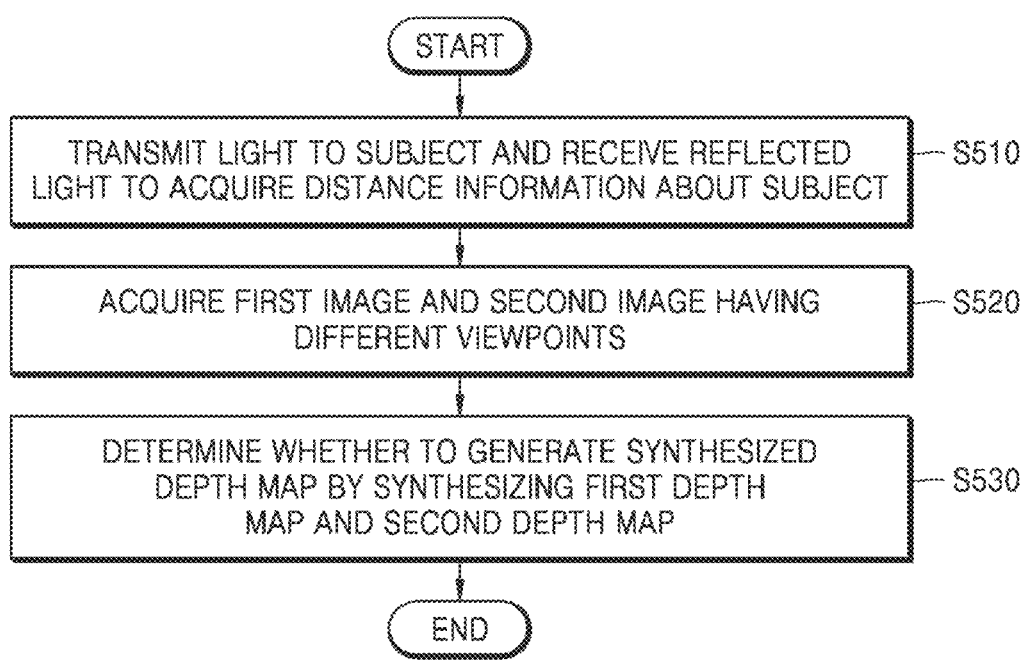
FIG. 16 is another flowchart illustrating an example method of operating the digital photographing apparatus 100.

FIG. 16 is another flowchart illustrating an example method of operating the digital photographing apparatus 100.

In operation S510, the digital photographing apparatus 100 may, for example, transmit a light to the subject and receive the reflected light to acquire distance information about the subject.

For example, the digital photographing apparatus 100 may acquire distance information of the subject using an active mode. The active mode may refer, for example, to a mode in which the active sensor emits a light or an electromagnetic wave to the subject and acquires the light or the electromagnetic wave reflected from the subject to acquire distance information of the subject. A depth map acquired by using the active sensor may be referred to as a first depth map.

In operation S520, the digital photographing apparatus 100 may acquire a first image and a second image having different viewpoints.

For example, the digital photographing apparatus 100 may acquire the first image and the second image having different viewpoints using a dual optical system. The dual optical system may refer to two optical systems disposed at a certain distance therebetween. The dual optical system may photograph the subject at different viewpoints to acquire a depth map representing the distance between the digital photographing apparatus 100 and the subject. A depth map acquired using the dual optical system may be referred to as a second depth map.

In operation S530, the digital photographing apparatus 100 may determine whether to generate a synthesized depth map by synthesizing the first depth map and the second depth map.

Figure 17:
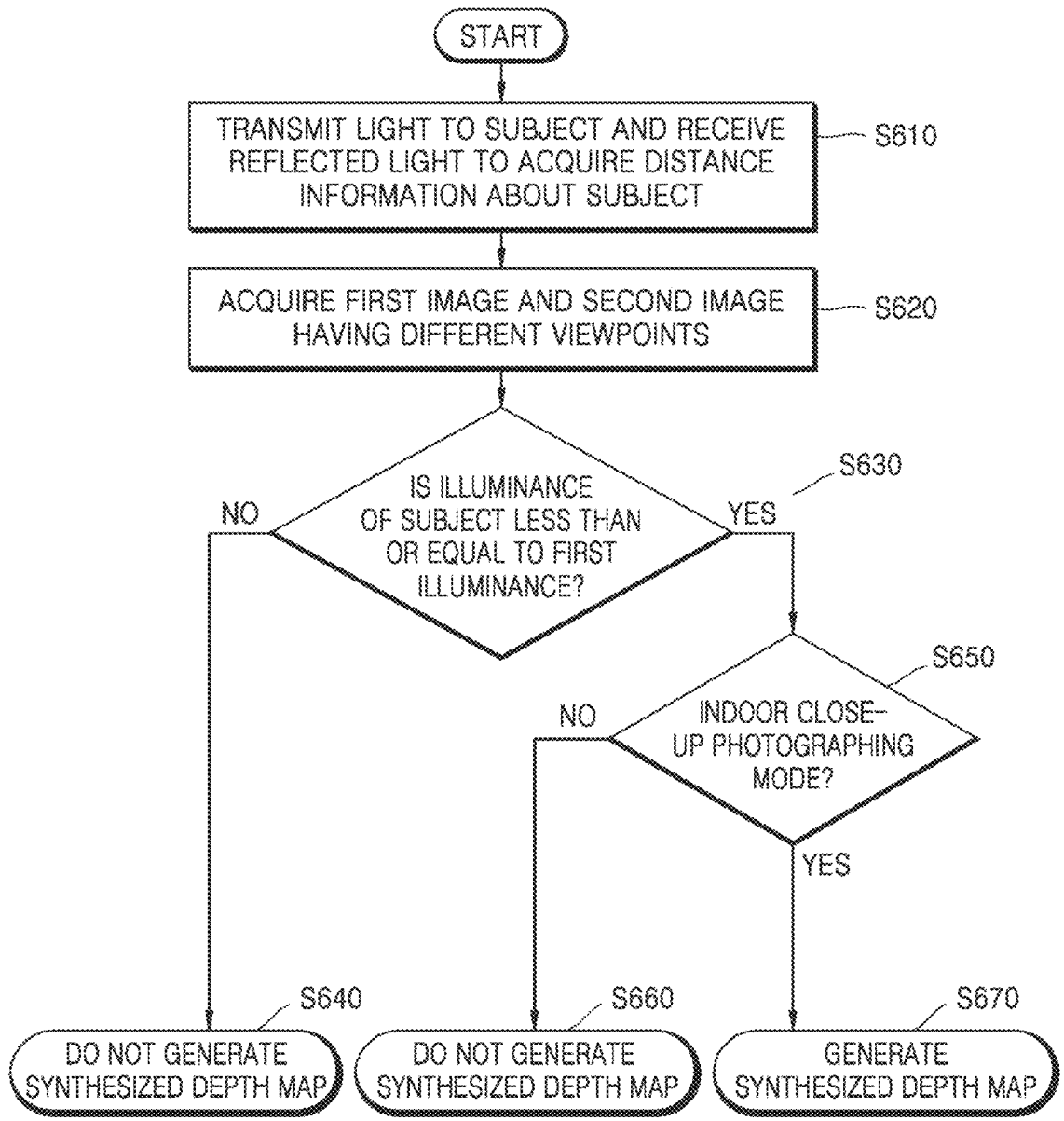
FIG. 17 is another flowchart illustrating an example method of operating the digital photographing apparatus 100.

FIG. 17 is another flowchart illustrating an example method of operating the digital photographing apparatus 100.

In operation S610, the digital photographing apparatus 100 may transmit a light to the subject and receive the reflected light to acquire distance information about the subject.

In operation S620, the digital photographing apparatus 100 may acquire a first image and a second image having different viewpoints.

In operation S630, the digital photographing apparatus 100 may determine whether the illuminance of the subject is less than or equal to a first illuminance.

The first illuminance may refer, for example, to the maximum illuminance of the subject for enabling the active sensor to sense the light or the electromagnetic wave transmitted to and reflected from the subject. When the iHuminance of the subject is higher than the first illuminance, it may be difficult for the active sensor to sense the light or the electromagnetic wave.

When determining that the illuminance of the subject is less than or equal to the first illuminance (in operation S630), in operation S640, the digital photographing apparatus 100 may determine not to generate a synthesized depth map.

According to an example embodiment, when determining that the illuminance of the subject is less than or equal to the first illuminance, the digital photographing apparatus 100 may determine not to generate the synthesized depth map and may acquire a first depth map based on the distance information about the subject.

When determining that the illuminance of the subject is greater than the first illuminance (in operation S630), in operation S650, the digital photographing apparatus 100 may determine whether the photographing mode thereof is an indoor close-up photographing mode.

When determining that the photographing mode is not an indoor close-up photographing mode (in operation S650), in operation S660, the digital photographing apparatus 100 may determine not to generate the synthesized depth map.

The case where the photographing mode of the digital photographing apparatus 100 is not an indoor close-up photographing mode may correspond to an outdoor photographing mode or the case where the digital photographing apparatus 100 photographs an indoor perspective view.

According to an example embodiment, the digital photographing apparatus 100 may acquire a second depth map in the case of photographing an indoor perspective view.

When the distance between the digital photographing apparatus 100 and the subject is too great and thus a great error occurs in the process of sensing the light reflected from the subject by the active sensor, the active sensor of the digital photographing apparatus 100 may not accurately sense the distance information of the subject. In this case, the digital photographing apparatus 100 may determine not to generate the synthesized depth map and may acquire the second depth map.

The case where the distance between the digital photographing apparatus 100 and the subject is too great and thus a great error occurs in the process of sensing the light reflected from the subject by the active sensor may be referred to, for example, as a perspective mode in the process of generating the synthesized depth map.

According to an example embodiment, the digital photographing apparatus 100 may acquire the second depth map when the photographing mode of the digital photographing apparatus 100 is an outdoor photographing mode and the illuminance is greater than the first illuminance. When the outdoor illuminance is high, the case of not generating the synthesized depth map by the digital photographing apparatus 100 may be advantageous in terms of the power consumption.

When determining that the photographing mode is an indoor close-up photographing mode (in operation S650), in operation S670, the digital photographing apparatus 100 may determine to generate the synthesized depth map.

Figure 18:
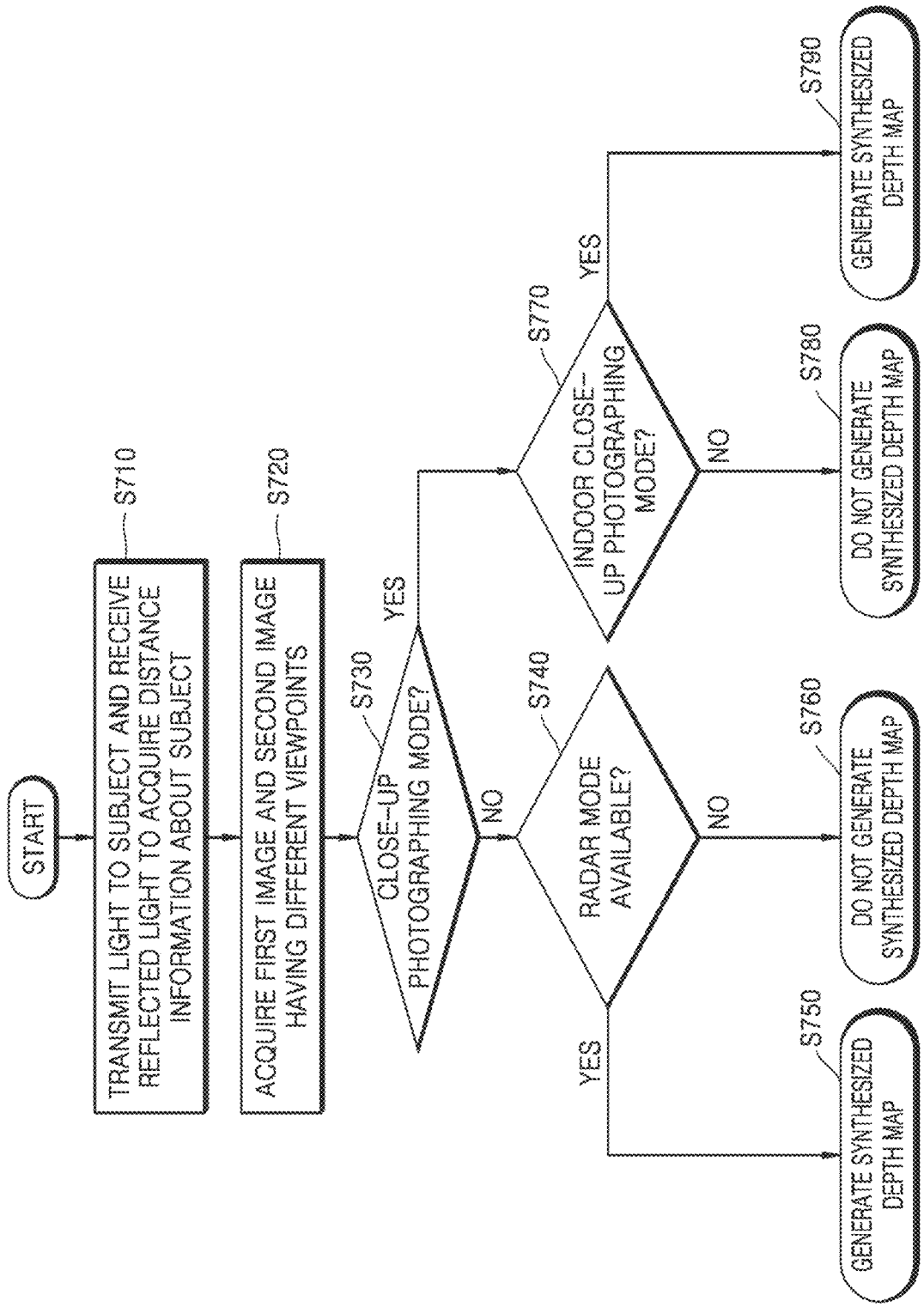
FIG. 18 is another flowchart illustrating an example method of operating the digital photographing apparatus 100.

FIG. 18 is another flowchart illustrating an example method of operating the digital photographing apparatus 100.

In operation S710, the digital photographing apparatus 100 may transmit a light to the subject and receive the reflected light to acquire distance information about the subject.

In operation S720, the digital photographing apparatus 100 may acquire a first image and a second image having different viewpoints.

In operation S730, the digital photographing apparatus 100 may determine whether the photographing mode thereof is a close-up photographing mode.

When determining that the photographing mode is not a close-up photographing mode (in operation S730), in operation S740, the digital photographing apparatus 100 may determine whether a radar mode is available.

When determining that the radar mode is available (in operation S740), in operation S750, the digital photographing apparatus 100 may determine to generate a synthesized depth map.

For example, according to an example embodiment, when the active sensor is a radar sensor or a lidar sensor, the digital photographing apparatus 100 may acquire the distance between the digital photographing apparatus 100 and the subject even when the subject is distant therefrom.

When determining that the radar mode is not available (in operation S740), in operation S760, the digital photographing apparatus 100 may determine not to generate the synthesized depth map.

According to an example embodiment, when determining that the radar mode is not available, the digital photographing apparatus 100 may generate the second depth map.

When determining that the photographing mode is a close-up photographing mode (in operation S730), in operation S770, the digital photographing apparatus 100 may determine whether the photographing mode is an indoor close-up photographing mode.

When determining that the photographing mode is not an indoor close-up photographing mode (in operation S770), in operation S780, the digital photographing apparatus 100 may determine not to generate the synthesized depth map.

When determining that the photographing mode is an indoor close-up photographing mode (in operation S770), in operation S790, the digital photographing apparatus 100 may determine to generate the synthesized depth map.

Figure 19:
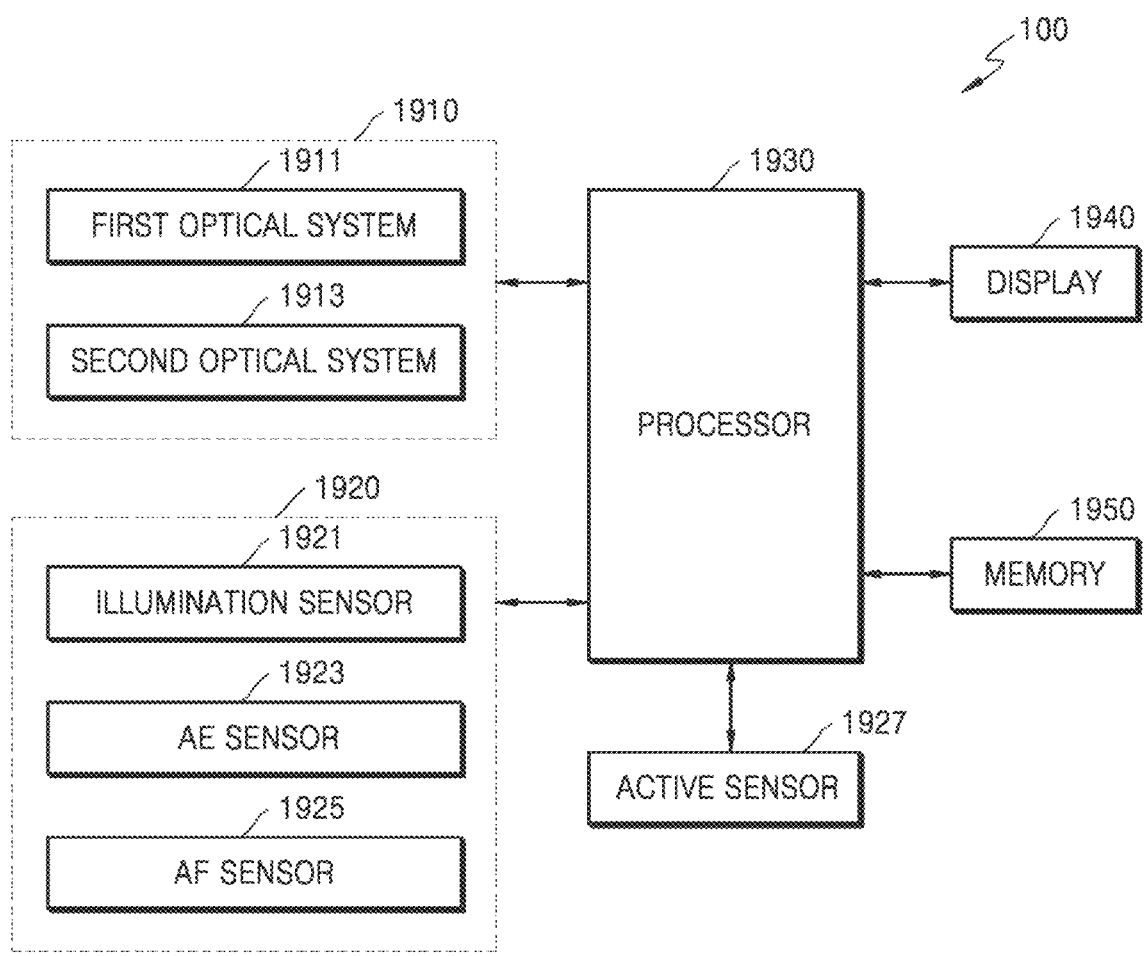
FIG. 19 is a block diagram illustrating an example structure of the digital photographing apparatus 100.

FIG. 19 is a block diagram illustrating an example structure of the digital photographing apparatus 100.

According to an example embodiment, the digital photographing apparatus 100 may include an optical system 1910, a sensor 1920, an active sensor 1927, a processor 1930, a display (e.g., including a display panel) 1940, and a memory 1950.

The optical system 1910 may include, for example, a plurality of optical systems. The optical system may include, for example, at least one lens and an image sensor and acquire an image signal through the image sensor.

The optical system 1910 may include a first optical system 1911 and a second optical system 1913, and the first optical system 1911 and the second optical system 1913 may be an asymmetric optical system.

According to an example embodiment, the first optical system 1911 and the second optical system 1913 may be an asymmetric optical system including a wide-angle optical system configured to acquire a wide-angle image and a telephoto optical system configured to acquire a telephoto image with the subject zoomed.

According to another example embodiment, the first optical system 1911 and the second optical system 1913 may be an asymmetric optical system including an RGB optical system configured to acquire a color image and a mono optical system configured to acquire a black-and-white image.

The first optical system 1911 and the second optical system 1913 may be dual optical systems disposed at a certain distance therebetween.

For example, the sensor 1920 may be used to detect the photographing mode and the photographing environment including the illuminance of the subject and the distance between the digital photographing apparatus 100 and the subject. The illuminance of the subject may include both the illuminance of the main subject photographed by the digital photographing apparatus 100 and the illuminance of the background photographed by the digital photographing apparatus 100.

The sensor 1920 may include, for example, an illumination sensor 1921, an AE sensor 1923, and an AF sensor 1925.

The illumination sensor 1921 may detect the illuminance of the periphery of the digital photographing apparatus 100 to output a control signal to the processor 1930.

The AE sensor 1923 may detect the luminance of the subject to output a control signal to the processor 1930.

The AF sensor 1925 may output a signal about a contrast value in a contrast AF mode. Also, for use in, for example, a phase difference operation, the AF sensor 1925 may output pixel information to the processor 1930 in a phase difference AF mode. A phase difference operation of the processor 1930 may be performed by a correlation operation of a plurality of pixel column signals. The position of a focus or the direction of a focus may be obtained as a result of the phase difference operation. The distance between the digital photographing apparatus 100 and the subject may be acquired by using the phase difference detected by the AF sensor 1925.

The active sensor 1927 may refer, for example, to a sensor configured to acquire distance information of the subject by using an active mode.

The active mode may refer to a mode in which an active sensor emits a light or an electromagnetic wave to a subject and acquires the light or the electromagnetic wave reflected from the subject to acquire distance information of the subject. A depth map acquired using the active sensor may be referred to as a first depth map. For example, the active sensor 1927 may be implemented by an IR sensor, a structured light sensor, a TOF sensor, a radar sensor, or a lidar sensor, or the like.

The processor 1930 may be configured to determine whether to generate a synthesized image by synthesizing an image acquired from the first optical system 1911 and an image acquired from the second optical system 1913, based on one or more of the illuminance of the subject, the distance between the digital photographing apparatus 1913 and the subject, and the photographing mode thereof. Also, the processor 1930 may be configured to determine whether to generate the synthesized image based on a received input (e.g., a user input). The illuminance of the subject, the distance between the digital photographing apparatus 100 and the subject, and the photographing mode may be acquired based on the sensor 1920.

According to an example embodiment, when the first optical system 1911 and the second optical system 1913 are respectively a wide-angle optical system and a telephoto optical system, the processor 1930 may be configured to determine whether to generate a synthesized image of a wide-angle image and a telephoto image by synthesizing the wide-angle image and the telephoto image, based on one or more of the illuminance of the subject, the distance between the digital photographing apparatus 100 and the subject, and the photographing mode.

When the illuminance is greater than a critical subject illuminance, the processor 1930 may be configured to determine to generate a synthesized image of the wide-angle image and the telephoto image by synthesizing the wide-angle image and the telephoto image. The critical subject illuminance may refer, for example, to an illuminance in a case where a noise caused by the synthesis of the wide-angle image and the telephoto image becomes greater than a noise existing in the original image.

The processor 1930 may be configured to determine to generate the synthesized image when the distance between the digital photographing apparatus 100 and the subject is within a perspective mode range. The perspective mode range may refer, for example, to a case where an occlusion does not occur because the distance between the digital photographing apparatus 100 and the subject is sufficiently great in comparison to the length of the baseline.

According to another example embodiment, when the first optical system 1911 and the second optical system 1913 are respectively an RGB optical system and a mono optical system, the processor 1930 may be configured to determine whether to generate a synthesized image of a color image and a black-and-white image by synthesizing the color image and the black-and-white image, based on the illuminance of the subject.

When the illuminance of the subject is a low illuminance and the RGB data included in the color image is greater than or equal to a predetermined value, the processor 1930 may be configured to determine to generate the synthesized image by synthesizing the color image and the black-and-white image. The case of the illuminance of the subject being a low illuminance may refer, for example, to a case where the illuminance of the subject is not sufficiently high and thus the color image has a lower SNR than the black-and-white image. Also, the case of the RGB signal data included in the color image being greater than or equal to the predetermined value may refer to a case where the numerical values of red, green, and blue colors are sufficient to acquire the colors of the subject by the processor 1930.

When the first optical system 1911 and the second optical system 1913 are dual optical systems disposed at a certain distance therebetween, the processor 1930 may be configured to acquire a second depth map representing the distance between the digital photographing apparatus 100 and the subject by using the images acquired at different viewpoints from the first optical system 1911 and the second optical system 1913.

Based on one or more of the illuminance of the subject and the photographing mode of the digital photographing apparatus 100, the processor 1930 may be configured to determine whether to synthesize the first depth map acquired using the active sensor 1927 and the second depth map acquired using the first optical system 1911 and the second optical system 1913.

For example, when the illuminance of the subject is greater than a first illuminance for enabling the active sensor 1927 to sense the light reflected from the subject, the active sensor 1927 may not accurately sense the light reflected from the subject. In this example, the processor 1930 may be configured to determine not to generate the synthesized depth map and may acquire the second depth map.

Since the position of the subject is too distant, a great error may occur when the active sensor 1927 senses the light reflected from the subject. This case may be referred to as a perspective mode in the process of generating the synthesized depth map. The active sensor 1927 may not accurately sense the distance information between the digital photographing apparatus 100 and the subject in the perspective mode. In this example, the processor 1930 may be configured to determine not to generate the synthesized depth map and may acquire the second depth map.

The processor 1930 may be configured to determine whether to generate the synthesized image based on the power mode. For example, when the digital photographing apparatus 100 is in a low-power mode, the processor 1930 may be configured to determine not to generate the synthesized image in order to reduce power consumption.

The processor 1930 may be configured to display, on the display 1940, at least one of the image acquired from the first optical system 1911, the image acquired from the second optical system 1913, and the synthesized image thereof.

For example, the memory 1950 may store the acquired images and the synthesized image as still images, panoramic images, or moving images. The memory 1950 may include an internal memory or an external memory.

Figure 20:
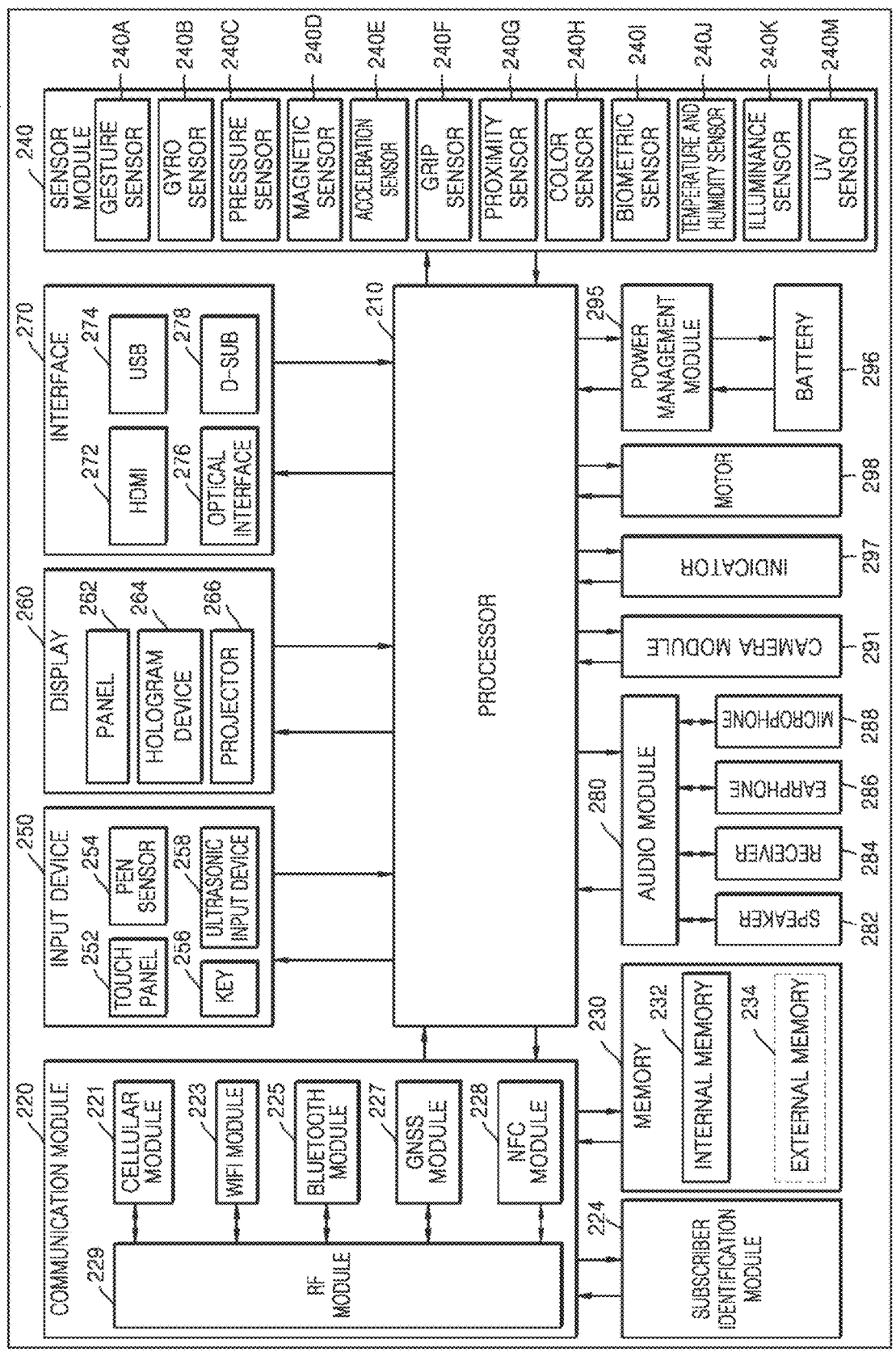
FIG. 20 is a block diagram illustrating an example structure of a digital photographing apparatus 2000.

FIG. 20 is a block diagram illustrating an example structure of a digital photographing apparatus 2000.

The digital photographing apparatus 2000 may include, for example, all or some of the elements of the digital photographing apparatus 100 illustrated in FIG. 19.

According to an example embodiment, the digital photographing apparatus 2000 may include at least one main processor (e.g., including processing circuitry including an application processor (AP)) 210, a communication module (e.g., including communication circuitry) 220, a subscriber identification module 224, a storage unit (e.g., including a memory) 230, a sensor module (e.g., including at least one sensor) 240, an input device (e.g., including input circuitry) 250, a display (e.g., including a display panel) 260, an interface (e.g., including interface circuitry) 270, an audio module 280, a camera module 291, a power management module 295, a battery 296, an indicator 297, and a motor 298.

For example, the main processor 210 may be configured to execute an operating system or an application program to control a plurality of hardware or software components connected to the main processor 210, and may be configured to perform various data processing and operations. For example, the main processor 210 may be implemented by a system on chip (SoC). According to an example embodiment, the main processor 210 may further include a graphic processing unit (GPU) and/or an image signal processor. The main processor 210 may include at least some (e.g., a cellular module 221) of the elements illustrated in FIG. 20. The main processor 210 may be configured to load a command or data received from at least one of the other elements (e.g., nonvolatile memory), to process the loaded command or data, and to store various data in the nonvolatile memory.

According to an example embodiment, the main processor 210 may include the processor 1930 illustrated in FIG. 19.

The communication module 220 may include, for example, the cellular module 221, a wireless fidelity (WiFi) module 223, a Bluetooth (BT) module 225, a global navigation satellite system (GNSS) module 227 (e.g., a GPS module, a Glonass module, a BeiDou module, or a Galileo module), a near-field communication (NFC) module 228, and a radio frequency (RF) module 229.

The storage unit 230 may include, for example, an internal memory 232 or an external memory 234. The internal memory 232 may include, for example, at least one of volatile memories (e.g., dynamic random-access memories (DRAMs), static RAMs (SRAMs), or synchronous DRAMs (SDRAMs)) and nonvolatile memories (e.g., one-time programmable read-only memories (OTPROMs), programmable ROMs (PROMs), erasable and programmable ROMs (EPROMs), electrically erasable and programmable ROMs (EEPROMs), mask ROMs, flash ROMs, flash memories (e.g., NAND flash memories or NOR flash memories), hard disk drives (HDDs), or solid state drives (SSDs)), or the like.

The external memory 234 may include, for example, a flash drive such as compact flash (CF), secure digital (SD), micro secure digital (micro-SD), mini secure digital (mini-SD), extreme digital (xD), multi-media card (MMC), or memory stick, or the like. The external memory 234 may be functionally and/or physically connected to the digital photographing apparatus 2000 through various interfaces.

For example, the sensor module 240 may measure physical quantities or sense an operation state of the digital photographing apparatus 2000 and convert the measured or sensed information into an electrical signal. The sensor module 240 may include, for example, one or more of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., an RGB sensor), a biometric sensor 240I, a temperature and humidity sensor 240J, an illuminance sensor 240K, and an ultraviolet (UV) sensor 240M. The sensor module 240 may further include a control circuit configured to control at least one sensor included therein. In various example embodiments, the digital photographing apparatus 2000 may further include a processor, which is configured to control the sensor module 240, as a portion of the main processor 210 or separately from the main processor 210, to control the sensor module 240 when the main processor 210 is in a sleep state.

According to an example embodiment, the gyro sensor 240B and/or the acceleration sensor 240E may be used to acquire information about a global motion and a local motion of a wide-angle image and a telephoto image.

The input device 250 may include, for example, a touch panel 252, a (digital) pen sensor 254, a key 256, or an ultrasonic input device 258. The touch panel 252 may include, for example, at least one of a capacitive touch panel, a resistive touch panel, an infrared touch panel, and an ultrasonic touch panel, or the like. Also, the touch panel 252 may further include a control circuit. The touch panel 252 may further include a tactile layer configured to provide a tactile response to the user.

For example, the (digital) pen sensor 254 may be a portion of the touch panel 252 or may include a separate recognition sheet. The key 256 may include, for example, a physical button, an optical key, or a keypad. The ultrasonic input device 258 may sense an ultrasonic wave generated by an input tool through a microphone (e.g., a microphone 288) and detect data corresponding to the sensed ultrasonic wave.

The display 260 may include a panel 262, a hologram device 264, or a projector 266. For example, the panel 262 may be implemented to be flexible, transparent, or wearable. The panel 262 and the touch panel 252 may be configured as one module.

The interface 270 may include, for example, a high-definition multimedia interface (HDMI) 272, a universal serial bus (USB) 274, an optical interface 276, or a D-subminiature (D-SUB) 278.

For example, the audio module 280 may perform bidirectional conversion between a sound and an electrical signal. For example, the audio module 280 may be configured to process sound information that is input or output through a speaker 282, a receiver 284, an earphone 286, or the microphone 288.

For example, the camera module 291 may be configured to capture a still image and a moving image (video). According to an example embodiment, the camera module 291 may include one or more image sensors (e.g., a front sensor or a rear sensor), a lens, an image signal processor (ISP), or a flash (e.g., a light-emitting diode (LED) or a xenon lamp), or the like.

The camera module 291 may include a plurality of optical systems. For example, the camera module 291 may include a first optical system and a second optical system.

Each of the first optical system and the second optical system may include a lens (not illustrated) and an image sensor (not illustrated).

For example, the power management module 295 may be configured to manage the power of the digital photographing apparatus 2000, According to an example embodiment, the power management module 295 may include a power management integrated circuit (PMIC), a charger integrated circuit (IC), or a battery or fuel gauge. The PMIC may have a wired and/or wireless charging mode. For example, the battery gauge may be configured to measure a residual capacity, a charged voltage, a current, or a temperature of the battery 296.

The indicator 297 may be configured to display particular states of all or some (e.g., the main processor 210) of the elements of the digital photographing apparatus 2000, for example, booting states, message states, or charging states. For example, the motor 298 may be configured to convert an electrical signal into a mechanical vibration and generate a vibration or a haptic effect.

The elements described herein may be configured by one or more components, and the names of the elements may be changed according to the type of the digital photographing apparatus. According to various example embodiments, the digital photographing apparatus may be configured to include at least one of the elements described herein, and some elements may be omitted or additional elements may be further included. Also, according to various example embodiments, some of the elements of the digital photographing apparatus may be combined into one entity to perform the same functions as the previous elements prior to the combination thereof.

Figure 21:
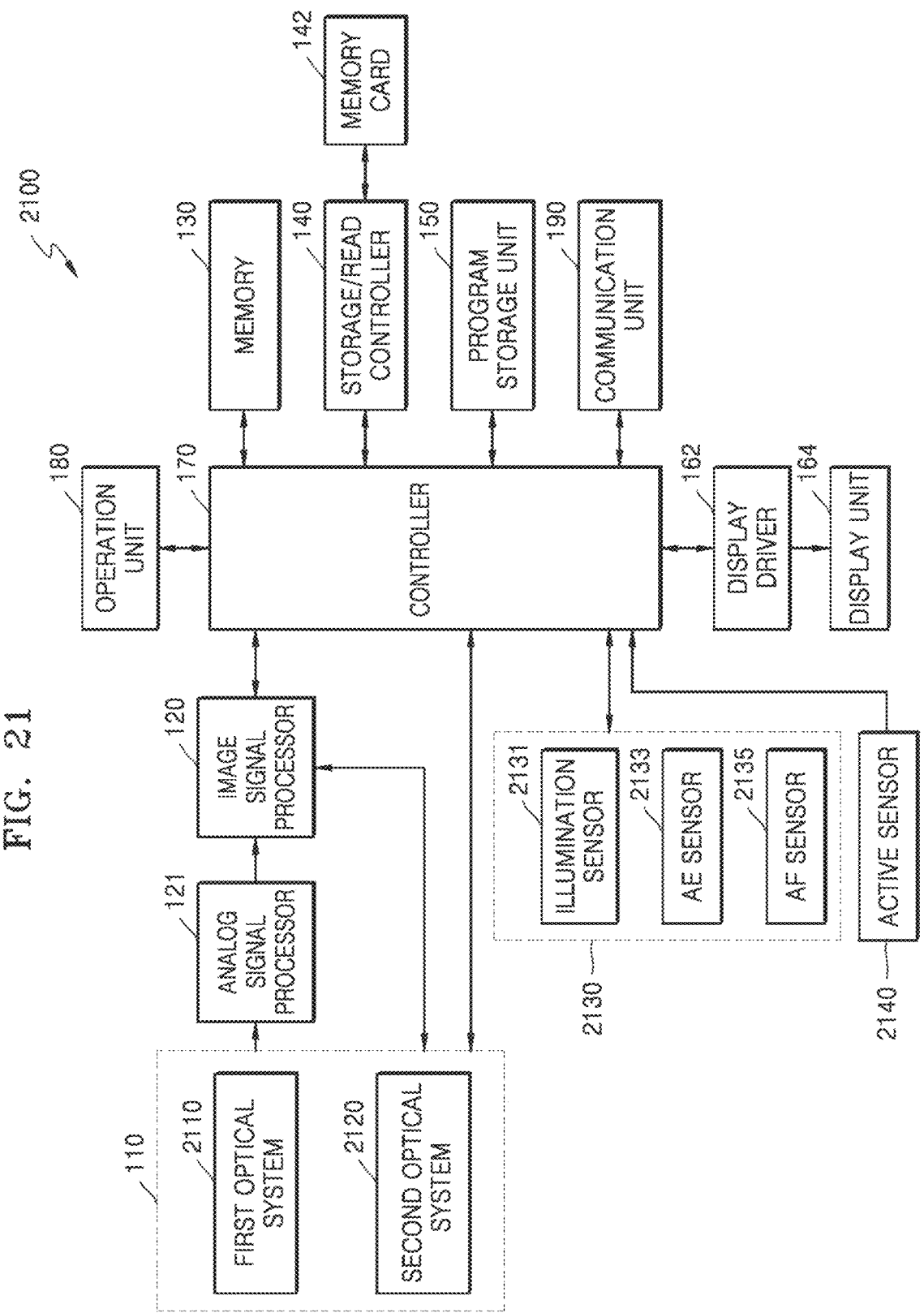
FIG. 21 is a block diagram illustrating an exam p e structure of a digital photographing apparatus 2100.

FIG. 21 is a block diagram illustrating an example structure of a digital photographing apparatus 2100.

The digital photographing apparatus 2100 may include, for example, all or some of the elements of the digital photographing apparatuses 100 and 2000 illustrated in FIGS. 19 and 20.

According to an example embodiment, the digital photographing apparatus 2100 may include an optical system 110, an image signal processor 120, an analog signal processor 121, a memory 130, a storage/read controller 140, a memory card 142, a program storage unit 150, a display driver 162, a display unit (e.g., including a display panel) 164, a controller (e.g., including processing circuitry) 170, an operation unit (e.g., including input circuitry) 180, and a communication unit (e.g., including communication circuitry) 190.

The controller 170 may be configured to control an overall operation of the digital photographing apparatus 2100. The controller 170 may be configured to provide a control signal for an operation of each element.

The optical system 110 may be configured to generate an electric signal from an incident light.

The optical system 110 may include a first optical system 2110 and a second optical system 2120 configured to acquire an image under a different optical condition from the first optical system 2110. According to an example embodiment, the first optical system 2110 and the second optical system 2120 may be an asymmetric optical system.

According to an example embodiment, the first optical system 2110 and the second optical system 2120 may be an asymmetric optical system including a wide-angle optical system configured to acquire a wide-angle image and a telephoto optical system configured to acquire a telephoto image with the subject zoomed.

According to another example embodiment, the first optical system 2110 and the second optical system 2120 may be an asymmetric optical system including an RGB optical system configured to acquire a color image and a mono optical system configured to acquire a black-and-white image.

The first optical system 2110 and the second optical system 2120 may be dual optical systems disposed at a certain distance therebetween.

Each of the first optical system 2110 and the second optical system 2120 may include a lens (not illustrated) and an image sensor (not illustrated). A subject light passing out through the lens may form a subject image on a light-receiving surface of the image sensor. The image sensor may be a charge-coupled device (CCD) image sensor or a complementary metal-oxide semiconductor image sensor (CIS), or the like, configured to convert an optical signal into an electrical signal.

For example, the analog signal processor 121 may be configured to perform noise reduction, gain control, waveform shaping, and analog-to-digital conversion on an analog signal provided from the optical system 110.

The image signal processor 120 may be configured to perform a particular function on an image data signal processed by the analog signal processor 121. For example, for image quality improvement and special effects, the image signal processor 120 may be configured to perform image signal processing, such as noise reduction, gamma correction, color filter array interpolation, color matrix, color correction, and color enhancement, white balancing, luminance smoothing, and color shading, with respect to input image data. The image signal processor 120 may be configured to compress the input image data into an image file, or may restore the image data from the image file. An image compression format may be reversible or irreversible. For example, a still image may be compressed into a Joint Photographic Experts Group (JPEG) format or a JPEG 2000 format. Also, in the case of recording a moving image (video), a plurality of frames may be compressed into a video file in accordance with the Moving Picture Experts Group (MPEG) standard. For example, an image file may be generated in accordance with the exchangeable image file format (Exit) standard.

The image signal processor 120 may be configured to generate a video file from an imaging signal generated by the image sensor. The imaging signal may be a signal that is generated by the image sensor and is then processed by the analog signal processor 121. The image signal processor 120 may be configured to generate frames to be included in a video file from an imaging signal, encode the frames in accordance with an appropriate standard, for example, MPEG4, 11.264/AVC, or windows media video (WMV), compress a video, and generate a video file by using the compressed video. The video file may be generated in various formats such as mpg, mp4, 3gpp, avi, asf, and mov.

Image data output from the image signal processor 120 may be input to the storage/read controller 140 directly or through the memory 130. The storage/read controller 140 may store the image data in the memory card 142 automatically or according to a signal input by the user. Also, the storage/read controller 140 may read data related to an image from an image file stored in the memory card 142 and input the data to the display driver 162 through the memory 130 or another path to display the image on the display unit 164. The memory card 142 may be detachably or permanently attached to the digital photographing apparatus 2100. For example, the memory card 142 may be a flash memory card such as a secure digital (SD) card.

For example, the image signal processor 120 may be configured to perform sharpness processing, chromatic processing, blur processing, edge emphasis processing, image interpretation processing, image recognition processing, and image effect processing. The image recognition processing may include, for example, face recognition processing and scene recognition processing. In addition, the image signal processor 120 may be configured to perform image signal processing for displaying image data on the display unit 164. For example, the image signal processor 120 may perform luminance level adjustment, color correction, contrast adjustment, contour emphasis adjustment, screen splitting, character image generation, and image synthesis.

A signal processed by the image signal processor 120 may be input to the controller 170 directly or through the memory 130. In this example, the memory 130 may operate as a main memory of the digital photographing apparatus 2100 and may temporarily store information necessary for the operation of the image signal processor 120 or the controller 170. The program storage unit 150 may store programs such as an operating system and an application system for driving the digital photographing apparatus 2100.

The digital photographing apparatus 2100 may include a sensor 2130. For example, the sensor 2130 may be used to detect the photographing mode and the photographing environment including the illuminance of the subject and the distance between the digital photographing apparatus 2100 and the subject. The illuminance of the subject may include both the illuminance of the main subject photographed by the digital photographing apparatus 2100 and the illuminance of the background photographed by the digital photographing apparatus 2100.

The sensor 2130 may include, for example, an illumination sensor 2131, an auto exposure (AE) sensor 2133, and an auto focusing (AF) sensor 2135.

The illumination sensor 2131 may detect the illuminance of the periphery of the digital photographing apparatus 2100 to output a control signal to the controller 170.

The AE sensor 2133 may detect the luminance of the subject to output a control signal to the controller 170.

The AF sensor 2135 may output a signal about a contrast value in a contrast AF mode. Also, for use in a phase difference operation, the AF sensor 2135 may output pixel information to the controller 170 in a phase difference AF mode. A phase difference operation of the controller 170 may be performed by a correlation operation of a plurality of pixel column signals. The position of a focus or the direction of a focus may be obtained as a result of the phase difference operation. The distance between the digital photographing apparatus 2100 and the subject may be acquired by using the phase difference detected by the AF sensor 2135.

The digital photographing apparatus 2100 may further include an active sensor 2140.

The active sensor 2140 may refer to a sensor configured to acquire distance information between the digital photographing apparatus 2100 and the subject by using an active mode.

The active mode may refer to a mode in which an active sensor emits a light or an electromagnetic wave to a subject and acquires the light or the electromagnetic wave reflected from the subject to acquire distance information of the subject. A depth map acquired by using the active sensor 2140 may be referred to as a first depth map. For example, the active sensor 2140 may be implemented by an IR sensor, a structured light sensor, a TOF sensor, a radar sensor, or a lidar sensor, or the like.

In addition, the digital photographing apparatus 2100 may include the display unit 164 to display an operation state of the digital photographing apparatus 2100 or image information acquired by the digital photographing apparatus 2100. The display unit 164 may provide visual information and/or auditory information to the user. In order to provide the visual information, the display unit 164 may include, for example, a liquid crystal display (LCD) panel or an organic light-emitting diode (OLED) display panel, or the like. Also, the display unit 164 may include a touchscreen for recognizing a touch input.

The display driver 162 may provide a driving signal to the display unit 164.

The controller 170 may be configured to process an input image signal and to control the components of the digital photographing apparatus 2100 based on the processed image signal or an external input signal. The controller 170 may correspond to one or more processors. The processor may be implemented by an array of logic gates, or may be implemented by a combination of a general-purpose microprocessor and a memory that stores a program executable in the general-purpose microprocessor. Those of ordinary skill in the art will understand that the processor may be implemented by other types of hardware, processing circuitry, or the like and may include one or more cores.

For example, the controller 170 may be configured to control the overall operations of the elements (such as a shutter and a stroboscope) of the digital photographing apparatus 2100 by generating control signals for controlling auto focusing, zoom adjustment, focus adjustment, and automatic exposure compensation by executing the program stored in the program storage unit 150 or by using a separate module.

The controller 170 may be connected to an external monitor and perform image signal processing so that an image signal input from the image signal processor 120 may be displayed on the external monitor. The controller 170 may be configured to transmit the processed image data to the external monitor so that an image corresponding to the processed image data may be displayed on the external monitor.

The controller 170 may be configured to determine whether to generate a synthesized image by synthesizing an image acquired from the first optical system 2110 and an image acquired from the second optical system 2120, based on one or more of the illuminance of the subject, the distance between the digital photographing apparatus 2100 and the subject, and the photographing mode thereof. The controller 170 may be configured to determine whether to generate the synthesized image based on a received input (e.g., a user input). The illuminance of the subject, the distance between the digital photographing apparatus 2100 and the subject, and the photographing mode may be acquired based on the sensor 2130.

According to an example embodiment, when the first optical system 2110 and the second optical system 2120 are respectively a wide-angle optical system and a telephoto optical system, the controller 170 may be configured to determine whether to generate a synthesized image of a wide-angle image and a telephoto image by synthesizing the wide-angle image and the telephoto image, based on at least one of the illuminance of the subject, the distance between the digital photographing apparatus 2100 and the subject, and the photographing mode.

According to another example embodiment, when the first optical system 2110 and the second optical system 2120 are respectively an RGB optical system and a mono optical system, the controller 170 may be configured to determine whether to generate a synthesized image of a color image and a black-and-white image by synthesizing the color image and the black-and-white image, based on the illuminance of the subject.

When the first optical system 2110 and the second optical system 2120 are dual optical systems disposed at a certain distance therebetween, the controller 170 may be configured to acquire a second depth map representing the distance between the digital photographing apparatus 2100 and the subject using the images acquired at different viewpoints from the first optical system 2110 and the second optical system 2120.

Based on one or more of the illuminance of the subject and the photographing mode of the digital photographing apparatus 2100, the controller 170 may be configured to determine whether to synthesize the first depth map acquired using the active sensor 2140 and the second depth map acquired by using the first optical system 2110 and the second optical system 2120.

The controller 170 may be configured to determine whether to generate a synthesized image based on the power mode of the digital photographing apparatus 2100. For example, when the digital photographing apparatus 2100 is in a low-power mode, the controller 170 may be configured to determine not to generate a synthesized image in order to reduce power consumption.

Based on one or more of the position of the subject, the illuminance of the subject, and the input, the controller 170 may be configured to control the display unit 164 to display at least one of the image acquired from the first optical system 2110, the image acquired from the second optical system 2120, and the synthesized image thereof.

Figure 22:
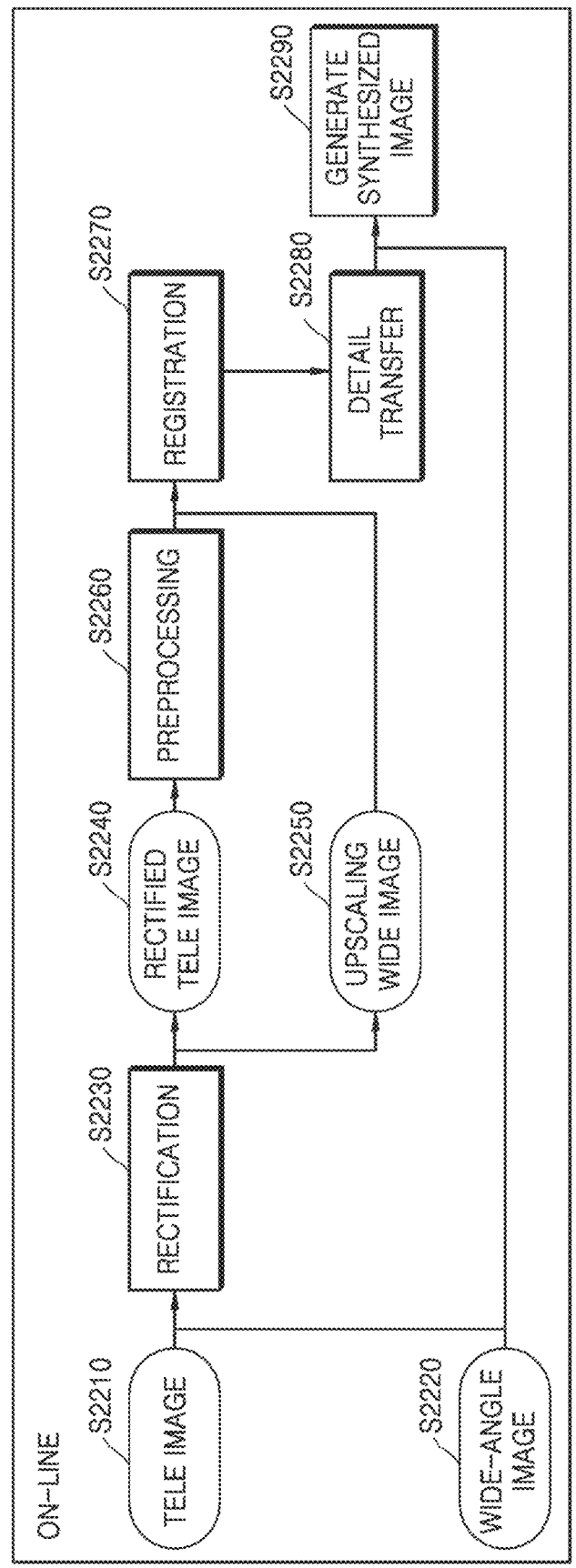
FIG. 22 is a flow diagram illustrating an example process of synthesizing a wide-angle image and a telephoto image by the digital photographing apparatus 100.

FIG. 22 is a flow diagram illustrating an example process of synthesizing a wide-angle image and a telephoto image by the digital photographing apparatus 100.

Referring to FIG. 22, in operation S2210, the digital photographing apparatus 100 may acquire a telephoto image, referred to in FIG. 22 as a "tele image."

In operation S2220, the digital photographing apparatus 100 may acquire a wide-angle image.

In operation S2230, the digital photographing apparatus 100 may rectify the telephoto image. For example, the digital photographing apparatus 100 may modify the viewpoint of the telephoto image in accordance with the wide-angle image.

In operation S2240, the digital photographing apparatus 100 may acquire a rectified telephoto image.

In operation S2250, the digital photographing apparatus 100 may upscale the wide-angle image. For example, the digital photographing apparatus 100 may magnify an ROI of the wide-angle image to adjust the same in accordance with the size of the telephoto image.

In operation S2260, the digital photographing apparatus 100 may preprocess the rectified telephoto image. For example, the digital photographing apparatus 100 may adjust the brightness, definition, and contrast of the telephoto image in accordance with the upscaled wide-angle image.

In operation S2270, the digital photographing apparatus 100 may register the preprocessed telephoto image and the upscaled wide-angle image.

In operation S2280, the digital photographing apparatus 100 may fetch detailed information of the telephoto image in order to improve the image quality of a synthesized image. In this example, for example, using statistical information generated in the registration, the digital photographing apparatus 100 may fetch occlusion information in addition to the detailed information, the illuminance information, and the blur information of two images.

In operation S2290, the digital photographing apparatus 100 may generate a synthesized image. For example, the digital photographing apparatus 100 may synthesize an image of a desired scale based on the upscaled wide-angle image and the original wide-angle image.

In order to naturally display a boundary between a synthesized wide-angle image portion and an unsynthesized wide-angle image portion, the digital photographing apparatus 100 may apply alpha blending to the vicinity of the boundary therebetween.

According to the various example embodiments, the photographing environment may be automatically sensed to select one of the two images acquired from the asymmetric optical system or synthesize the images acquired by the asymmetric optical system.

According to the various example embodiments, since the photographing environment may be automatically sensed to determine whether to perform an image synthesis, the output image optimized for the photographing environment may be generated and thus the power consumption thereof may be reduced and the time taken for image processing may be saved.

The methods of operating the digital photographing apparatuses according to the example embodiments may be stored in computer-readable recording mediums being implemented in the form of program commands that may be performed by various computer or processing circuitry. The computer-readable recording mediums may include program commands, data files, and data structures either alone or in combination. The program commands may be those that are especially designed and configured for the disclosure, or may be those that are publicly known and available to those of ordinary skill in the art. Examples of the computer-readable recording mediums may include magnetic recording mediums such as hard disks, floppy disks, and magnetic tapes, optical recording mediums such as compact disk read-only memories (CD-ROMs) and digital versatile disks (DVDs), magneto-optical recording mediums such as floptical disks, and hardware devices such as read-only memories (ROMs), random-access memories (RAMS), and flash memories that are especially configured to store and execute program commands. Examples of the program commands may include machine language codes created by compilers, and high-level language codes that may be executed by computers by using interpreters.

Although the example embodiments have been described above in some detail, the scope of the disclosure is not limited thereto and those of ordinary skill in the art will understand that various modifications and improvements may be made therein without departing from the spirit and scope of the disclosure as defined by the following claims.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A photographing apparatus comprising:
a first camera, comprising a first lens, configured to obtain a first image with a first angle of view;
a second camera, comprising a second lens, configured to obtain a second image with a second angle of view narrower than the first angle of view, the first image being a wide angle image and the second image being a telephoto image; and
at least one processor, coupled with the first camera and the second camera, and individually and/or collectively configured to:
in response to receipt of an input to capture an image with a magnification less than a predetermined magnification, determine whether to synthesize the first image and the second image for an output image based on an illuminance of a region of interest so that:
(a) when the illuminance of the region of interest is less than a first illuminance value, generate the output image by magnifying the first image or the second image based on the magnification, where the first image and second images are not synthesized for the output image; and
(b) when the illuminance of the region of interest is greater than the first illuminance value, generate the output image by synthesizing the first image and the second image and digitally magnifying the synthesized image based on the magnification.

2. The photographing apparatus of claim 1, wherein the output image generated by synthesizing the first image and the second image includes a first region corresponding to a synthesized region of the first image and the second image and a second region corresponding to a region of the first image.

3. The photographing apparatus of claim 2, wherein the at least one processor, individually and/or collectively, is configured to:
generate the output image corresponding to the image generated by synthesizing the first image and the second image by applying a blending with respect to a boundary between the first region and the second region.

4. The photographing apparatus of claim 1, further comprising a time-of-flight (TOF) sensor configured to obtain distance information between the photographing apparatus and a subject.

5. The photographing apparatus of claim 1, wherein the at least one processor, individually and/or collectively, is configured to control to perform auto focusing.

6. The photographing apparatus of claim 1, wherein the at least one processor, individually and/or collectively, is configured to: when a magnification for the output image is the same as the predetermined magnification, generate the output image corresponding to the second image regardless of the obtained illuminance of the region of interest, so that the first image and second images are not synthesized for the output image.

7. The photographing apparatus of claim 1, wherein the at least one processor, individually and/or collectively, is configured to: when a magnification for the output image is greater than the predetermined magnification, generate the output image corresponding to the second image regardless of the obtained illuminance of the region of interest, so that the first image and second images are not synthesized for the output image.

8. The photographing apparatus of claim 1, wherein the at least one processor, individually and/or collectively, is configured to:
when the illuminance of the region of interest is greater than the first illuminance value and a magnification of the output image is lower than the predetermined magnification, generate the output image corresponding to the image generated by synthesizing the first image and the second image based on the magnification.

9. The photographing apparatus of claim 1, wherein the illuminance of the region of interest includes at least one of: a first illuminance corresponding to a main subject in the first image, a second illuminance corresponding to a background of the first image, a third illuminance corresponding to a main subject in the second image, or a fourth illuminance corresponding to a background of the second image.

10. The photographing apparatus of claim 1, wherein the at least one processor, individually and/or collectively, is configured to:
determine a magnification factor to upscale the first image or the second image, and
obtain an upscaled image using the magnification factor.

11. A photographing apparatus comprising:
a first camera configured to obtain a first image with a first angle of view;
a second camera configured to obtain a second image with a second angle of view narrower than the first angle of view; and
at least one processor, coupled with the first camera and the second camera, and individually and/or collectively configured to:
in response to receipt of an input to capture an image with a magnification less than a predetermined magnification, determine whether to synthesize the first image and the second image for an output image based on an illuminance of a region of interest so that:
(a) when the illuminance of the region of interest is less than a first illuminance value, generate the output image by magnifying the first image or the second image based on the magnification, where the first image and second images are not synthesized for the output image; and
(b) when the illuminance of the region of interest is greater than the first illuminance value, generate the output image by synthesizing the first image and the second image and digitally magnifying the synthesized image based on the magnification; and
in response to a magnification for the output image being greater than the predetermined magnification, generate the output image corresponding to the second image regardless of the obtained illuminance of the region of interest, so that the first image and second images are not synthesized for the output image.

12. A method performed by a photographing apparatus, the method comprising:
obtaining a first image corresponding to a first angle of view and a second image corresponding to a second angle of view, wherein the second angle of view is narrower than the first angle of view; and
determining whether to synthesize the first image and the second image for an output image based on an illuminance of a region of interest of at least one of the first image or the second image, in response to receipt of an input to capture an image with a magnification less than a predetermined magnification, so that:

(a) when the illuminance of the region of interest is less than a first illuminance value, generating the output image by magnifying the first image or the second image based on the magnification, where the first image and second images are not synthesized for the output image; and (b) when the illuminance of the region of interest is greater than the first illuminance value, generating the output image by synthesizing the first image and the second image and digitally magnifying the synthesized image based on the magnification.

13. The method of claim 12, wherein the image generated by synthesizing the first image and the second image includes a first region corresponding to a synthesized region of the first image and the second image and a second region corresponding to a region of the first image.

14. The method of claim 13, wherein the generating the output image corresponding to the image generated by synthesizing the first image and the second image comprises blending with respect to a boundary between the first region and the second region.

15. The method of claim 12, further comprising obtaining distance information between the photographing apparatus and a main subject via a time-of-flight (TOF) sensor.

16. The method of claim 12, further comprising controlling to perform auto focusing.

17. The method of claim 12, further comprising:
when magnification of the output image is the same as the predetermined magnification, generating the output image corresponding to the second image regardless of the obtained illuminance without synthesizing the first and second images.

18. The method of claim 12, wherein:
when the illuminance of the region of interest is greater than the first illuminance value and a magnification for the output image is lower than the predetermined magnification, generating the output image by synthesizing the first image and the second image based on the magnification.

19. The method of claim 12, wherein the illuminance of the region of interest includes at least one of: a first illuminance corresponding to a main subject in the first image, a second illuminance corresponding to a background of the first image, a third illuminance corresponding to a main subject in the second image, or a fourth illuminance corresponding to a background of the second image.

20. The method of claim 12, further comprising:
determining a magnification factor to upscale the first image or the second image, and
obtaining an upscaled image using the magnification factor.

21. A computer-readable non-transitory storage medium having stored therein instructions that, when executed by a processor of an imaging apparatus, cause the imaging apparatus to perform operations comprising:
obtaining a first image corresponding to a first angle of view and a second image corresponding to a second angle of view, wherein the second angle of view is narrower than the first angle of view; and
determining whether to synthesize the first image and the second image for an output image based on an illuminance of a region of interest of at least one of the first image or the second image, in response to receipt of an input to capture an image with a magnification less than a predetermined magnification, so that:

(a) when the illuminance of the region of interest is less than a first illuminance value, generating the output image by magnifying the first image or the second image based on the magnification, where the first image and second images are not synthesized for the output image; and (b) when the illuminance of the region of interest is greater than the first illuminance value, generating the output image by synthesizing the first image and the second image and digitally magnifying the synthesized image based on the magnification.

\* \* \* \* \*